United States Patent
Chung et al.

(10) Patent No.: US 7,295,033 B2
(45) Date of Patent: Nov. 13, 2007

(54) IMPEDANCE ADJUSTMENT CIRCUITS AND METHODS USING REPLICAS OF VARIABLE IMPEDANCE CIRCUITS

(75) Inventors: Hoe-ju Chung, Gyeonggi-do (KR); Jae-jun Lee, Gyeonggi-do (KR); Kyu-hyoung Kim, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 123 days.

(21) Appl. No.: 11/247,846

(22) Filed: Oct. 11, 2005

(65) Prior Publication Data

US 2006/0087339 A1  Apr. 27, 2006

(30) Foreign Application Priority Data

Oct. 11, 2004  (KR) ............... 10-2004-0081109

(51) Int. Cl.
*H03K 19/003* (2006.01)
(52) U.S. Cl. .................... 326/30; 326/27; 326/21; 327/108
(58) Field of Classification Search ............ 326/30; 327/108
See application file for complete search history.

(56) References Cited

U.S. PATENT DOCUMENTS

| | | | |
|---|---|---|---|
| 5,606,275 A | 2/1997 | Farhang et al. | |
| 6,307,791 B1 | 10/2001 | Otsuka et al. | |
| 6,560,290 B2 | 5/2003 | Ahn et al. | |
| 6,573,746 B2 * | 6/2003 | Kim et al. | 326/30 |
| 2003/0117147 A1 * | 6/2003 | Song | 324/601 |
| 2004/0189343 A1 * | 9/2004 | Jang | 326/30 |

FOREIGN PATENT DOCUMENTS

KR  1020020041121 A  6/2002

OTHER PUBLICATIONS

Notice to Submit Response, Korean Application No. 10-2004-0081109, Mar. 31, 2006.

* cited by examiner

*Primary Examiner*—Vibol Tan
(74) *Attorney, Agent, or Firm*—Myers Bigel Sibley & Sajovec PA

(57) ABSTRACT

An impedance adjustment circuit for controlling an impedance of a variable impedance circuit includes a calibration circuit including a replica of the variable impedance circuit and configured to generate an impedance control signal for the variable impedance circuit based on a voltage generated at the replica of the variable impedance circuit in response to a reference current. The calibration circuit may be configured to generate the reference current based on a reference resistor coupled thereto. In particular, the calibration circuit may be configured to match a current in the replica of the variable impedance circuit and a current in the reference resistor to generate the voltage at the replica of the variable impedance circuit.

28 Claims, 16 Drawing Sheets

IMPEDANCE ADJUSTMENT CIRCUITS AND METHODS USING REPLICAS OF VARIABLE IMPEDANCE CIRCUITS

CROSS-REFERENCE TO RELATED PATENT APPLICATIONS

This application claims the priority of Korean Patent Application No. 10-2004-0081109, filed on Oct. 11, 2004 in the Korean Intellectual Property Office, the disclosures of which is incorporated herein in its entirety by reference.

BACKGROUND OF THE INVENTION

The present invention relates to semiconductor (integrated circuit) devices and, more particularly, to impedance adjustment circuits and methods for semiconductor devices.

In general, a termination resistor with a resistance, which is equal to the characteristic impedance on a transmission channel, is connected to a receiving or transmitting terminal of a semiconductor device. The termination resistor may reduce reflection of signals transmitted via the transmission channel by substantially matching the impedance of the receiving or transmitting terminal to the characteristic impedance of the transmission channel. Conventionally, a termination resistor is typically installed outside a semiconductor chip. However, in recent years, on-die terminators (ODTs) installed inside a semiconductor chip have replaced termination resistors. A typical ODT requires less power than a termination resistor because it uses a switching circuit that is switched on or off to control current flowing through the ODT. However, a resistance of the ODT may change responsive to changes in process, voltage, and temperature (PVT), and thus, the resistance of the ODT typically is calibrated. An impedance matching circuit for an ODT is described in U.S. Pat. No. 6,690,211.

FIG. 1 is a circuit diagram of a conventional semiconductor device 10 connected to a chip set 30 via a channel 20. The semiconductor device 10 communicates with the chip set 30 via the channel 20. In FIG. 1, $Z_O$ denotes the characteristic impedance of the channel 20, and $C_P$ denotes the parasitic impedance on the channel 20. The semiconductor device 10 includes an output driver 11, an input receiver 12, and an internal circuit 13. The output driver 11 includes a pull-up circuit 14 that includes a PMOS transistor P and a resistor R1, and a pull-down circuit 15 that includes an NMOS transistor N and a resistor R2. The output driver 11 outputs data signals, and further acts as an ODT. The impedance at an output node D of the output driver 11 is substantially equalized to the characteristic impedance $Z_O$.

Referring to FIG. 2, when the output driver 11 operates as a driver, one of the PMOS transistor P and the NMOS transistor N is turned on in response to an internal data signal DOUT. In this case, the impedance at the output node D is determined by the impedance of the pull-up circuit 14 or the pull-down circuit 15. Thus, the impedance of the pull-up circuit 14 or the pull-down circuit 15 preferably matches the characteristic impedance $Z_O$. When the output driver 11 operates as an ODT, both the PMOS transistor P and the NMOS transistor N are turned on. In this case, the impedance at the output node D is determined by the parallel combination of the impedances of the pull-up circuit 14 and the pull-down circuit 15. Preferably, the parallel combination of the impedances of the pull-up circuit 14 and the pull-down circuit 15 matches the characteristic impedance $Z_O$. Conventionally, VDD/2 is a reference voltage used to calibrate the impedance of the output driver 11. Specifically, when one of the PMOS transistor P and the NMOS transistor N is turned on, the impedances of the pull-up circuit 14 and the pull-down circuit 15 are calibrated to adjust a voltage Vout at the output node D to VDD/2. The voltage Vout generated at the output node D is generally not VDD/2 when the output driver 11 operates.

When the internal data signal DOUT is at a logic high level, the PMOS transistor P is turned off and the NMOS transistor N is turned on. A voltage Vout1 generated at an output node D1 of the output driver 11 is given by:

$$Vout1 = Vout2 \times \frac{\text{impedance of pull-down circuit 15}}{\text{sum of impedance of pull-down circuit 15, and parallel sum of impedances } R3 \text{ and } R4 \text{ of terminator 31}} \quad (1)$$

When the internal data signal DOUT is at a logic high level, the generated voltage Vout1 obtained from Equation (1) is 0.3 V.

When the internal data signal DOUT is at logic low level, the PMOS transistor P is turned on and the NMOS transistor N is turned off. The voltage Vout1 generated at the output node D1 is given by:

$$Vout1 = \left[ (VDD - Vout2) + \frac{\text{parallel sum of impedances } R3 \text{ and } R4 \text{ of terminator 31}}{\text{sum of impedance of pull-up circuit 14, and parallel sum of impedances } R3 \text{ and } R4 \text{ of terminator 31}} \right] + Vout2 \quad (2)$$

When the internal data signal DOUT is at a logic low level, the generated voltage Vout1 obtained from Equation (2) is 1.2 V.

As described above, when the output driver 11 operates, the voltage Vout1 generated at the output node D1 is 0.3 V or 1.2 V, that is, the voltage Vout1 is not 0.75 V, i.e., VDD/2. Accordingly, when the output driver 11, the impedance of which is calibrated using VDD/2 as the reference voltage, operates, the I-V characteristics of the output driver 11 may deteriorate.

FIG. 3A is a graph illustrating the operating characteristics of output drivers whose impedances are calibrated using a conventional method. In FIG. 3A, curves A1 through A3 indicate the I-V characteristics of the pull-down circuits of output drivers whose impedances are calibrated using the conventional method, and curves B1 through B3 indicate the I-V characteristics of the pull-up circuits of the output drivers whose impedances are calibrated using the conventional method. Also, the curves A1 and B1 illustrate the I-V characteristics of the output drivers with the best operating conditions, the curves A3 and B3 illustrates the I-V characteristics of the output drivers with the worst operating conditions. The curves A2 and B2 illustrate the I-V characteristics of the output drivers with the med-level operating conditions. Because the impedances of the output drivers are calibrated using the conventional method, i.e., using the reference voltage, the curves A1 through A3 intersect when VDD/2, e.g., 0.75V, is used, and the curves B1 through B3 also intersect when VDD/2, e.g., 0.75V, is used.

FIG. 3B illustrates the result of a simulation in which the impedances of output drivers were calibrated using a conventional method. In detail, FIG. 3B illustrates the skew and aperture of a transmitted signal according to the value of the parasitic capacitance $C_P$ at the channel 20 when output voltages of the output drivers are VDD/2, e.g., 0.75V, and the impedances of the pull-down circuits with I-V characteristics indicated by the curves A1 through A3 of FIG. 3A are adjusted to 40 Ω. For convenience, the pull-down circuits that have the I-V characteristics indicated by the curves A1 through A3 will be referred to as pull-down circuits A1 through A3, respectively. When the output voltages of the output drivers are 0.3 V, the impedances of the pull-down circuits A1 through A3 are 38 Ω, 36 Ω, and 32 Ω, respectively. Referring to FIG. 3B, an increase in the parasitic capacitance $C_P$ increases the skew of the pull-down circuits A1 through A3 but reduces the apertures thereof. In the simulation, variations in the skews of the pull-down circuits A1 through A3 were 1 ps, 3 ps, 2 ps, and 1 ps, when the parasitic capacitances $C_P$ were 2.0 pF, 2.5 pF, 3.0 pF, and 3.5 pF, respectively. That is, the variations were less than 4 ps. Also, variations in the apertures of the pull-down circuits A1 through A3 were 9 mV, 13 mV, 14 mV, and 12 mV when the parasitic capacitances $C_P$ were 2.0 pF, 2.5 pF, 3.0 pF, and 3.5 pF, respectively. That is, the variations were less than 15 mV. The impedance of the output driver is preferably calibrated such that variations in the skews and apertures of the output drivers are reduced regardless of the I-V conditions of the output drivers.

As described above, conventionally, the impedance of an output driver is calibrated using a reference voltage that is not related to an output voltage generated when the output driver operates, which may thereby increase variations in the skew and aperture of a transmitted signal and deteriorate the operating performance of the output driver.

SUMMARY OF THE INVENTION

In some embodiments of the present invention, an impedance adjustment circuit for controlling an impedance of a variable impedance circuit includes a calibration circuit including a replica of the variable impedance circuit and configured to generate an impedance control signal for the variable impedance circuit based on a voltage generated at the replica of the variable impedance circuit in response to a reference current. The calibration circuit may be configured to generate the reference current based on a reference resistor coupled thereto. In particular, the calibration circuit may be configured to match a current in the replica of the variable impedance circuit and a current in the reference resistor to generate the voltage at the replica of the variable impedance circuit.

In certain embodiments, the variable impedance circuit includes a pull-up circuit and/or a pull-down circuit. For example, the variable impedance circuit may include a pull-down circuit and a pull-up circuit connected to an external signal node of an integrated circuit device. The replica of the variable impedance circuit may include a replica of the pull-down circuit and a replica of the pull-up circuit. The calibration circuit may be configured to generate a current in the replica of the pull-down circuit and to apply a first impedance control signal to the pull-down circuit and to the replica of the pull-down circuit based on a voltage generated at the replica of the pull-down circuit in response to the current in the replica of the pull-down circuit. The calibration circuit may be further configured to generate a current in the replica of the pull-up circuit and to apply a second impedance control signal to the pull-up circuit and to the replica of the pull-up circuit based on a voltage generated at the replica of the pull-up circuit in response to the current in the replica of the pull-up circuit. The pull-up circuit and the pull-down circuit may be included, for example, in an output driver and/or an on-die terminator (ODT).

In further embodiments of the present invention, a calibration circuit may include a first current mirror configured to match the current in the reference resistor and the current in the replica of the pull-down circuit and a first impedance control signal generator configured to generate the first impedance control signal responsive to the voltage of the replica of the pull-down circuit so as to substantially equalize the voltage of the replica of the pull-down circuit and a first reference voltage. The calibration circuit may further include a second current mirror configured to match the current in the reference resistor and the current in the replica of the pull-up circuit, and a second impedance control signal generator configured to generate the second impedance control signal responsive to the voltage of the replica of the pull-up circuit so as to substantially equalize a voltage across the replica of the pull-up circuit and a second reference voltage.

In some embodiments, the first impedance control signal generator may include a first comparator configured to generate a first comparison signal responsive to a comparison of the voltage of the replica of the pull-down circuit to the first reference voltage and a first register configured to increment and/or decrement the first impedance control signal responsive to the first comparison signal. The second impedance control signal generator may include a second comparator configured to generate a second comparison signal responsive to a comparison of the voltage of the replica of the pull-up circuit to the second reference voltage, and a second register configured to increment and/or decrement the second impedance control signal responsive to the second comparison signal.

The first reference voltage may include a first one of a logic high reference voltage and a logic low reference voltage and the second reference voltage may include a second one of the logic high reference voltage and the logic low reference voltage. In some embodiments of the present invention, the pull-down circuit and the pull-up circuit are included in an output driver, the first reference voltage includes the logic low reference voltage, and the second reference voltage includes the logic high reference voltage. In other embodiments, the pull-down circuit and the pull-up circuit are included in an ODT, the first reference voltage includes the logic high reference voltage, and the second reference voltage includes the logic low reference voltage.

In additional embodiments of the present invention, a calibration circuit includes a current mirror configured to match a current in the reference resistor and the current in the replica of the variable impedance circuit and an impedance control signal generator configured to generate the impedance control signal responsive to the voltage of the replica of the variable impedance circuit so as to substantially equalize the voltage of the replica of the variable impedance circuit and a reference voltage. The impedance control signal generator may include a comparator configured to generate a comparison signal responsive to a comparison of the voltage of the replica of the variable impedance circuit and the reference voltage and a register configured to increment and/or decrement the impedance control signal responsive to the comparison signal. The comparator may include a first comparator, and the current mirror may include a first current source configured to generate the current in the reference resistor responsive to a current control signal, a second current source configured to generate the current in the replica of the variable impedance circuit responsive to the current control signal, and a second comparator configured to generate the current control signal responsive to a comparison of the reference voltage and a voltage generated at the reference resistor responsive to the current in the reference resistor.

In further embodiments, the comparator includes a first comparator, the reference voltage includes a first reference voltage, and the current mirror includes a first current source configured to generate the current in the reference resistor responsive to a current control signal, a second current source configured to generate the current in the replica of the variable impedance circuit responsive to the current control signal, and a second comparator configured to generate the current control signal responsive to a comparison of a second reference voltage and a voltage generated at the reference resistor responsive to the current in the reference resistor.

According to further aspects of the present invention, an integrated circuit device includes a variable impedance pull-down circuit and a variable impedance pull-up circuit coupled to an external signal node, a first calibration circuit configured to generate respective first and second impedance control signals for the variable impedance pull-down and pull-up circuits and a second calibration circuit configured to generate respective third and fourth impedance control signals for the variable impedance pull-down and pull-up circuits. The integrated circuit device further includes a selection circuit configured to receive the first, second, third and fourth impedance control signals, to apply the first and third impedance control signals to the respective variable impedance pull-up and pull-down circuits in response to a first state of a selection control signal, and to apply the second and fourth impedance control signals to the respective variable impedance pull-up and pull-down circuits in response to a second state of the selection control signal. The first state of the selection control signal may correspond to operation of the variable impedance pull-down and pull-up circuits as an output driver, and the second state of the selection control signal may correspond to operation of the variable impedance pull-down and pull-up circuits as an ODT.

In some embodiments, the first calibration circuit includes a first replica of the pull-down circuit and a first replica of the pull-up circuit and is configured to generate respective ones of the first and second impedance control signals based on respective voltages generated at respective ones of the first replica of the pull-down circuit and the first replica of the pull-up circuit in response to a first reference current. The second calibration circuit includes a second replica of the pull-down circuit and a second replica of the pull-up circuit and is configured to generate respective ones of the third and fourth impedance control signals based on respective voltages generated at respective ones of the second replica of the pull-down circuit and the second replica of the pull-up circuit in response to a second reference current. In other embodiments of the present invention, the first calibration circuit includes a first register configured to store the first impedance control signal and a first inverter configured to receive the stored first impedance control signal and to invert the stored first impedance control signal to generate the second impedance control signal. The second calibration circuit includes a second register configured to store the third impedance control signal and a second inverter configured to receive the stored third impedance control signal and to invert the stored third impedance control signal to generate the fourth impedance control signal.

In some method embodiments of the present invention, an impedance of a variable impedance circuit is controlled. A voltage is generated at a replica of the variable impedance circuit in response to a reference current. An impedance control signal for the variable impedance circuit is generated based on the voltage at the replica of the variable impedance circuit. The reference current may be generated based on a reference resistor. Generating a voltage at a replica of the variable impedance circuit in response to a reference current may include matching a current in the replica of the variable impedance circuit to a current in the reference resistor to thereby generate the voltage at the replica of the variable impedance circuit.

The variable impedance circuit may include a pull-down circuit and a pull-up circuit coupled to an external signal node of an integrated circuit device, the replica of the variable impedance circuit may include a replica of the pull-down circuit and a replica of the pull-up circuit, and the method may further include generating a current in the replica of the pull-down circuit, applying a first impedance control signal to the pull-down circuit and the replica of the pull-down circuit based on a voltage generated at the replica of the pull-down circuit in response to a current in the replica of the pull-down circuit, generating a current in the replica of the pull-up circuit, and applying a second impedance control signal to the pull-up circuit and the replica of the pull-up circuit based on a voltage generated at the replica of the pull-up circuit in response to a current in the replica of the pull-up circuit.

According to some embodiments of the present invention, there is provided an impedance calibration circuit including a calibration circuit generating a reference current by supplying an internal voltage to an external resistor connected to a calibration terminal, and outputting a first calibration signal and a second calibration signal in response to the reference current, a first reference voltage, a second reference voltage, a first impedance control signal, and a second impedance control signal; a first register increasing or reducing a value of the first impedance control signal in response to the first calibration signal; and a second register increasing or reducing a value of the second impedance control signal in response to the second calibration signal.

According to further embodiments of the present invention, there is provided an integrated circuit with an impedance calibration circuit that includes a first impedance calibration circuit, a second impedance calibration circuit, and a selection control circuit. The first impedance calibration circuit includes a driver calibration circuit generating a first reference current by applying an internal voltage to a first external resistor connected to a first calibration terminal, and outputting a first calibration signal and a second calibration signal in response to the first reference current, a first reference voltage, a second reference voltage, and the first and second impedance control signals; a first register increasing or reducing a value of the first impedance control signal in response to the first calibration signal; and a second register increasing or reducing a value of the second impedance control signal in response to the second calibration signal. Alternatively, the first impedance calibration circuit may include a first register and a first inverter. The first register stores a first impedance control signal received from an external controller via a transmission channel, and outputs the stored first impedance control signal. The first inverter inverts the first impedance control signal and outputs the inverted signal as a second impedance control signal.

The second impedance calibration circuit may include an on-die terminator calibration circuit generating a second reference current by applying the internal voltage to a second external resistor connected to a second calibration terminal, outputting a third calibration signal and a fourth calibration signal in response to the second reference current, a third reference current, a fourth reference voltage, and the third and fourth impedance control signals; a third register increasing or reducing a value of the third impedance control signal in response to the third calibration signal; and a fourth register increasing or reducing a value of the fourth impedance control signal in response to the fourth calibration signal. Alternatively, the second impedance calibration circuit may include a second register and a second inverter. The second impedance calibration circuit includes a second register storing and outputting the third impedance control signal received from the external control device via the transmission channel; and a second inverter inverting the third impedance control signal and outputting the fourth impedance control signal as the result of inversion. The selection control circuit outputs first and second selection signals in response to the selection control signal, the first and second control logic signals, and the first through fourth impedance control signals. The impedances of the pull-up circuits of the output driver can be determined by the first selection signals, and the impedances of the pull-down circuits of the output driver can be determined by the second selection signals.

According to yet further embodiments of the present invention, there is provided a method of adjusting the impedance of an output driver, the method including generating a first reference current by applying an internal voltage to a first external resistor connected to a first calibration terminal when the output driver operates as a driver; performing a first impedance calibration operation using the first reference current, a first reference voltage, and a second reference voltage, and generating first selection signals to adjust the impedance of the output driver to a first value; generating a second reference current by applying the internal voltage to a second external resistor connected to a second calibration terminal when the output driver operates as an on-die terminator; and performing a second impedance calibration operation using the second reference current, a third reference voltage, and a fourth reference voltage, and generating second selection signals to adjust the impedance of the output driver to a second value.

BRIEF DESCRIPTION OF THE DRAWINGS

The above and other aspects and advantages of the present invention will become more apparent by describing in detail exemplary embodiments thereof with reference to the attached drawings in which.

DETAILED DESCRIPTION OF THE INVENTION

Figure 1:
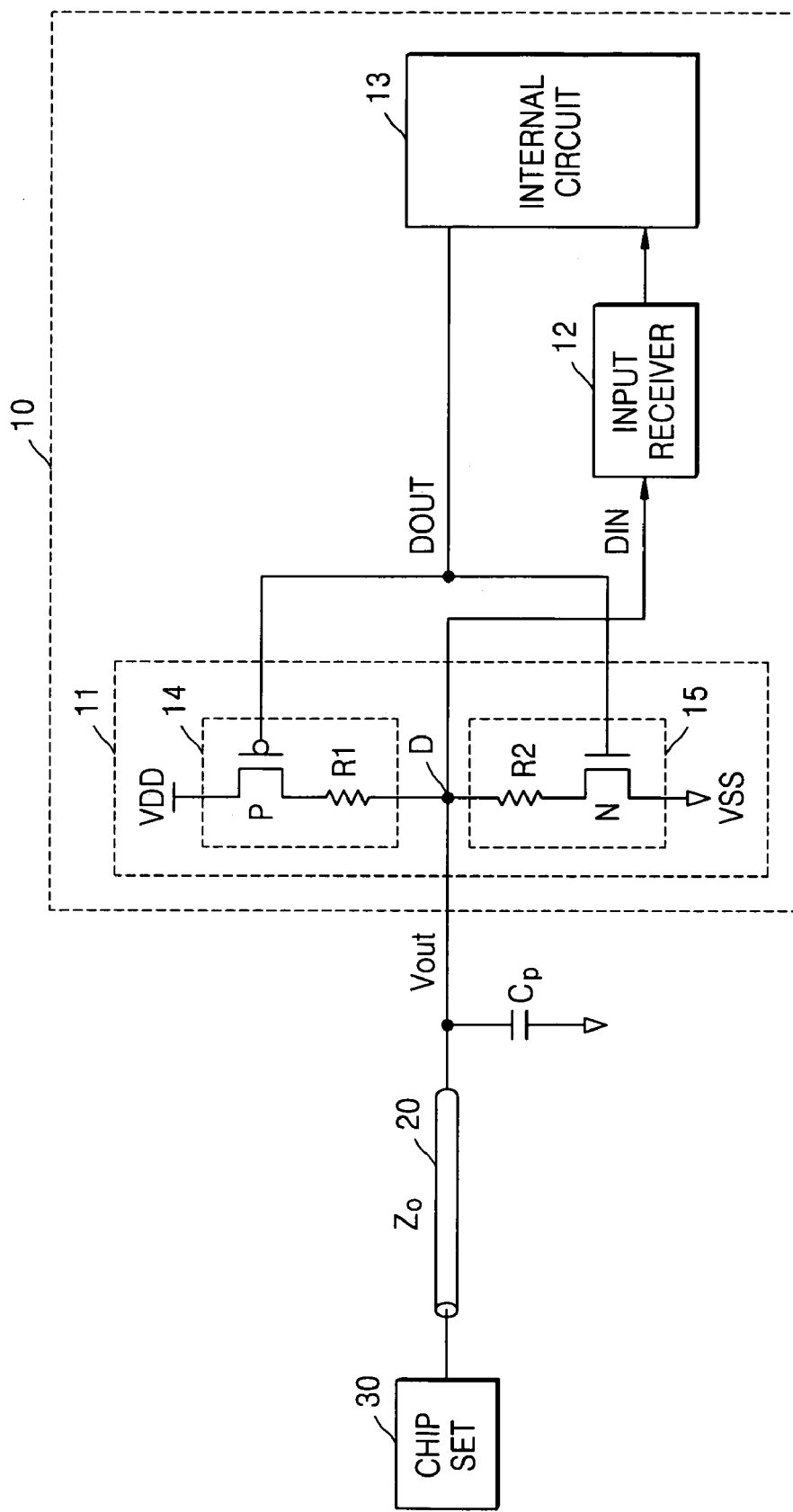
FIG. 1 is a circuit diagram of a conventional semiconductor device connected to a chip set via a channel.
Figure 2:
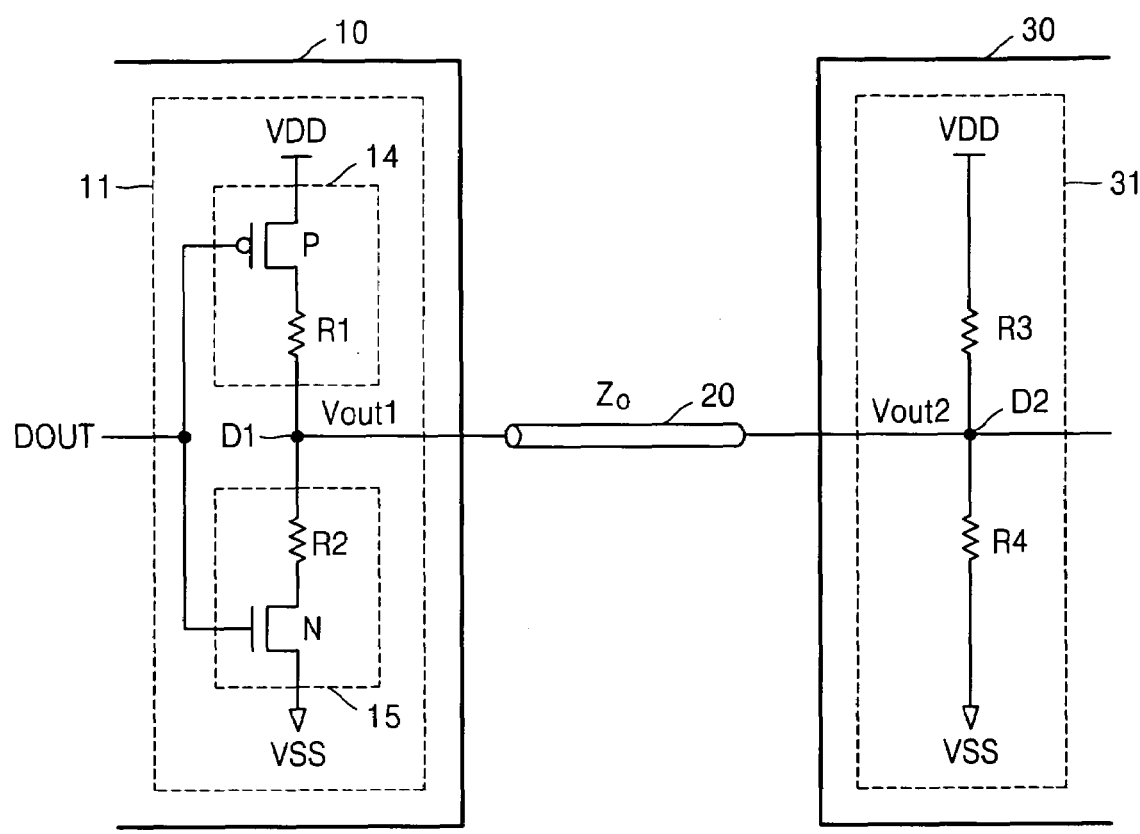
FIG. 2 illustrates the operation of an output driver of FIG. 1.

Specific exemplary embodiments of the invention now will be described with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements. It will be understood that when an element is referred to as being "connected" or "coupled" to another element, it can be directly connected or coupled to the other element or intervening elements may be present. Furthermore, "connected" or "coupled" as used herein may include wirelessly connected or coupled.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "includes," "including" and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present specification and will not be interpreted in an idealized or overly formal sense unless expressly so defined herein.

It will be understood that although the terms first and second are used herein to describe various elements, these elements should not be limited by these terms. These terms are only used to distinguish one element from another element. Thus, a first item could be termed a second item, and similarly, a second item may be termed a first item without departing from the teachings of the present invention. As used herein, the term "and/or" includes any and all combinations of one or more of the associated listed items. The symbol "/" may also used as a shorthand notation for "and/or".

Figure 4:
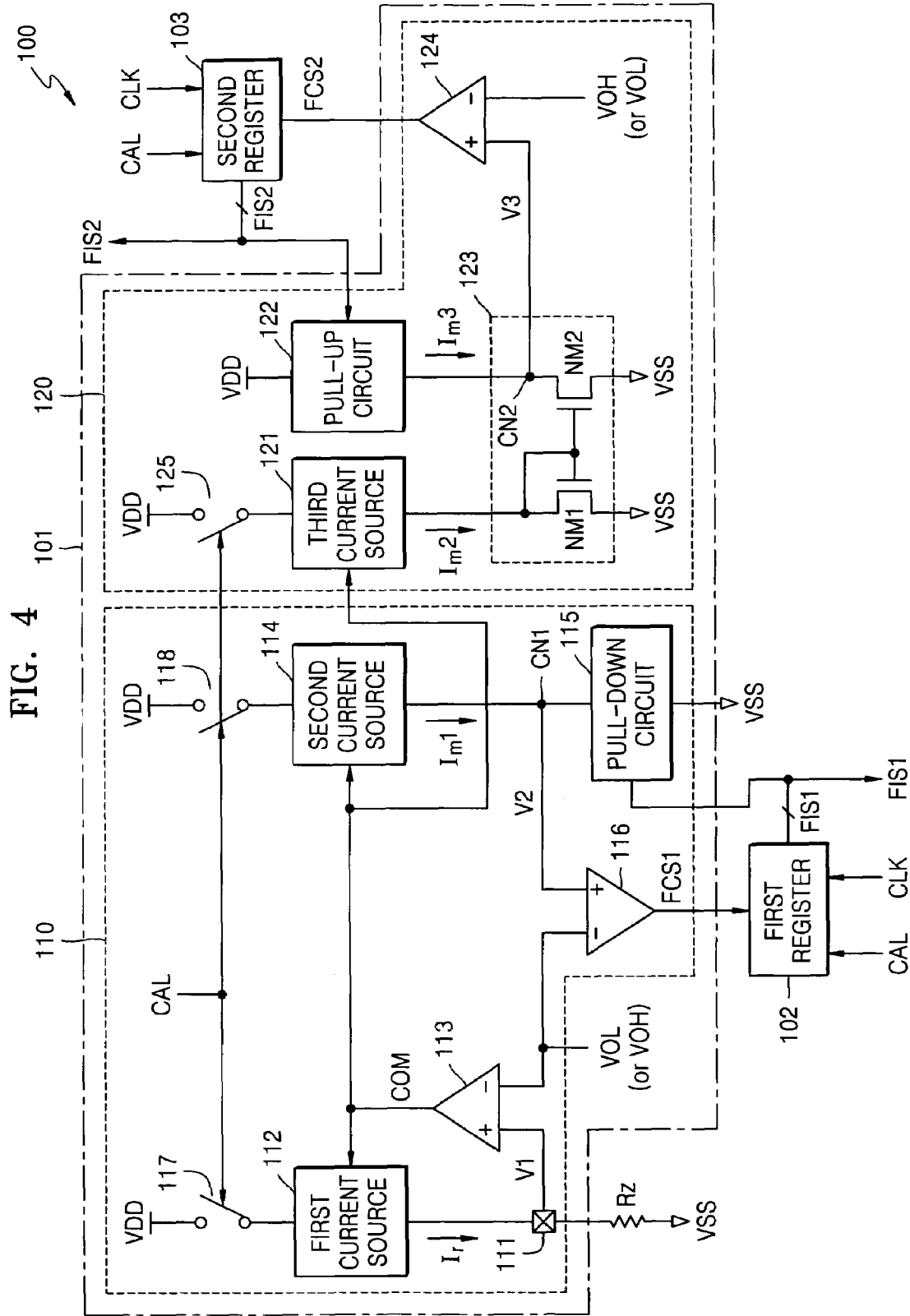
FIG. 4 is a block diagram of an impedance calibration circuit according to some embodiments of the present invention.

FIG. 4 is a block diagram of an impedance calibration circuit 100 for adjusting impedances of an on-die terminator (ODT)/output driver (not shown in FIG. 4) according to some embodiments of the present invention. The impedance calibration circuit 100 includes a calibration circuit 101, a first register 102, and a second register 103. The calibration circuit 101 includes a first calibration circuit 110 and a second calibration circuit 120. The first calibration circuit 110 includes a first current source 112, a first comparator 113, a second current source 114, a pull-down circuit 115, a second comparator 116, a first switching circuit 117, and a second switching circuit 118.

The first current source 112 supplies a reference current $I_r$ to an external resistor Rz connected to a calibration terminal 111, and increases or reduces the reference current $I_r$ in response to a comparison signal COM. The first comparator 113 compares a first output voltage V1 generated by the calibration terminal 111, with a reference voltage VOL or VOH, and outputs the comparison signal COM indicating the result of comparison. The reference voltage VOL is a minimum voltage (i.e., a logic low reference voltage) of a signal output from the ODT/output driver when the ODT/output driver operates. Also, the reference voltage VOH is a maximum voltage (i.e., a logic high reference voltage) of the signal output from the ODT/output driver when the ODT/output driver operates. When the first output voltage V1 is greater than the reference voltage VOL or VOH, the comparison signal COM output from the first comparator 113 is at a logic high level.

The second current source 114 generates a first mirror current $I_m1$ by forming a current mirror together with the first current source 112, and increases or reduces the first mirror current $I_m1$ in response to the comparison signal COM. The impedance value of the pull-down circuit 115 is determined by a first impedance control signal FIS1, which is also used to control the impedance of a pull-down circuit of the ODT/output driver. The pull-down circuit of the ODT/output driver has a construction substantially the same as the pull-down circuit 115, which, accordingly, serves as a replica of the pull-down circuit of the ODT/output driver. When a value of the first impedance control signal FIS1 changes, the impedance of the pull-down circuit 115 also changes. The pull-down circuit 115 generates a second output voltage V2 at a first control node CN1 by conducting the first mirror current $I_m1$ to the ground. The second comparator 116 compares the second output voltage V2 with the reference voltage VOL or VOH, and outputs a first calibration signal FCS1 indicating the result of comparison. More specifically, when the second output voltage V2 is greater than the reference voltage VOL or VOH, the first calibration signal FCS1 output from the second comparator 116 goes high. The same reference voltage is applied to the first and second comparators 113 and 116.

The first register 102 is enabled or disabled in response to a calibration control signal CAL. The first register 102 increases or reduces the value of the stored first impedance control signal FIS1 in response to the first calibration signal FCS1. Specifically, an initial value of the first impedance control signal FIS1 is stored in the first register 102. When the first calibration signal FCS1 is at a logic high level, the first register 102 increases the value of the first impedance control signal FIS1 by one bit in response to an edge of a clock signal CLK. When the first calibration signal FCS1 is at a logic low level, the first register 102 reduces the value of the first impedance control signal FIS1 by one bit in response to an edge of the clock signal CLK.

The first switching circuit 117 is connected to the first current source 112 and an internal voltage VDD, and turned on or off in response to the calibration control signal CAL. The second switching circuit 118 is connected to the second current source 114 and the internal voltage VDD, and turned on or off in response to the calibration control signal CAL.

The second calibration circuit 120 includes a third current source 121, a pull-up circuit 122, a current mirror circuit 123, a third comparator 124, and a third switching circuit 125. The third current source 121 generates a second mirror current $I_m2$ by forming a current mirror together with the first current source 112, and increases or reduces the second mirror current $I_m2$ in response to the comparison signal COM. The impedance of the pull-up circuit 122 is determined by a second impedance control signal FIS2, which also controls the impedance of a pull-up circuit of the ODT/output driver, which has a construction substantially the same as the pull-up circuit 122, which serves as a replica of the pull-up circuit of the ODT/output driver. Thus, a change in the value of the second impedance control signal FIS2 results in a change in the impedance of the pull-up circuit 122.

The pull-up circuit 122 is connected to a second control node CN2. The current mirror circuit 123 includes NMOS transistors NM1 and NM2 whose gates are connected to the third current source 121. A drain and source of the NMOS transistor NM1 are connected to the third current source 121 and a ground voltage VSS, respectively. A drain and source of the NMOS transistor NM2 are connected to the second control node CN2 and the ground voltage VSS, respectively. When the second mirror current $I_m2$ is supplied to the current mirror circuit 123, the current mirror circuit 123 generates a third mirror current $I_m3$, and generates a third output voltage V3 at the second control node CN2. The second mirror current $I_m2$ flows from the third current source 121 to the ground via the NMOS transistor NM1, and the third mirror current $I_m3$ flows from the pull-up circuit 122 to the ground via the NMOS transistor NM2. The third comparator 124 compares the third output voltage V3 with the reference voltage VOH or VOL, and outputs a second calibration signal FCS2 indicating the result of comparison.

In detail, when the third output voltage V3 is greater than the reference voltage VOH or VOL, the second calibration signal FCS2 output from the third comparator 124 goes high. In this case, the reference voltage input to the third comparator 124 is different from that input to the first and second comparators 113 and 116. For instance, when the reference voltage VOL is input to the first and second comparators 113 and 116, the reference voltage VOH is input to the third comparator 124, and vice versa.

The second register 103 is enabled or disabled in response to the calibration control signal CAL. The second register 103 increases or reduces the value of the stored second impedance control signal FIS2 in response to the second calibration signal FCS2. In detail, an initial value of the second impedance control signal FIS2 is stored in the second register 103. When the second calibration signal FCS2 is at a logic high level, the second register 103 increases the value of the second impedance control signal FIS2 by one bit in response to an edge of the clock signal CLK. When the second calibration signal FCS2 is at a logic low level, the second register 103 reduces the value of the second impedance control signal FIS2 by one bit in response to an edge of the clock signal CLK. The third switching circuit 125 is connected between the third current source 121 and the internal voltage VDD, and turned on or off in response to the calibration control signal CAL.

A method of calibrating the impedance of the ODT/output driver when operating as a driver using the impedance calibration circuit 100 will now be described. In this case, the reference voltage VOL is applied to the first and second comparators 113 and 116, and the reference voltage VOH is applied to the third comparator 124. The calibration terminal 111 is connected to the external resistor Rz. The resistance of the external resistor Rz is set equal to a desired impedance value of the ODT/output driver. For instance, when the impedance of the pull-down circuit of the ODT/output driver is to be calibrated to 40 Ω, the external resistor Rz is selected to have a resistance of 40 Ω. When the calibration control signal CAL is enabled, the first through third switching circuits 117, 118, and 125 are turned on, and the first and second registers 102 and 103 are enabled. The internal voltage VDD is applied between the first current source 112 and the external resistor Rz, and the calibration terminal 111 generates the first output voltage V1. The first output voltage V1 is determined by the reference current $I_r$ generated by the first current source 112 and the resistance of the external resistor Rz.

The first comparator 113 compares the first output voltage V1 with the reference voltage VOL, and outputs the comparison signal COM. The first current source 112 increases or reduces the reference current $I_r$ in response to the comparison signal COM, and the first output voltage V1 is increased or reduced in proportion to the reference current $I_r$. The first current source 112 controls the reference voltage to equalize the first output voltage V1 to the reference voltage VOL. In this case, the second current source 114 adjusts the first mirror current $I_m1$ until it is equal to the reference current $I_r$ in response to the comparison signal COM. The third current source 121 also adjusts the second mirror current $I_m2$ until it is equal to the reference current $I_r$ in response to the comparison signal COM. The impedance of the pull-down circuit 115 is adjusted to a predetermined value using the initial value of the first impedance control signal FIS1. The pull-down circuit 115 conducts the first mirror current $I_m1$ to the ground, and generates the second output voltage V2 at the first control node CN1.

The second output voltage V2 is determined by the first mirror current $I_m1$ and the impedance of the pull-down circuit 115. Because the reference current $I_r$ is maintained at a predetermined level, the first mirror current $I_m1$ is also maintained at the predetermined value. Thus, a change in the impedance of the pull-down circuit 115 changes the second output voltage V2.

The second comparator 116 compares the second output voltage V2 with the reference voltage VOL, and outputs the first calibration signal FCS1, which goes high or low according to the result of comparison. When the first calibration signal FCS1 is at a logic high level, the first register 102 increases the value of the first impedance control signal FIS1 in response to the clock signal CLK. When the first calibration signal FCS1 is at a logic low level, the first register 102 reduces the value of the first impedance control signal FIS1 in response to the clock signal CLK. An increase in the value of the first impedance control signal FIS1 reduces the impedance of the pull-down circuit 115, and a reduction in the value of the first impedance control signal FIS1 increases the impedance of the pull-down circuit 115. The first register 102 maintains the first impedance control signal FIS1 that controls the impedance of the pull-down circuit 115 at a substantially constant value to equalize the second output voltage V2 and the reference voltage VOL. As a result, the impedance of the pull-down circuit of the ODT/output driver is substantially equalized with the calibrated impedance of the pull-down circuit 115 in response to the first impedance control signal FIS1.

The current mirror circuit 123 generates the third mirror current $I_m3$ such that it is substantially equal to the second mirror current $I_m2$, and outputs the third output voltage V3 at the second control node CN2. The third output voltage V3 is substantially equal to a voltage obtained by subtracting a voltage divided by the pull-up circuit 122 from the internal voltage VDD. The distributed voltage is determined by the third mirror current $I_m3$ and the impedance of the pull-up circuit 122. Because the second mirror current $I_m2$ is maintained at a predetermined value, the third mirror current $I_m3$ is also maintained at the predetermined value. Thus, when the impedance of the pull-up circuit 122 changes, the third output voltage V3 also changes.

The third comparator 124 compares the third output voltage V3 with the reference voltage VOH, and outputs the second calibration signal FCS2 that goes high or low according to the result of comparison. The second register 103 increases the value of the second impedance control signal FIS2 in response to the clock signal CLK when the second calibration signal FCS2 goes high. Also, the second register 103 reduces the value of the second impedance control signal FIS2 in response to the clock signal CLK when the second calibration signal FCS2 goes low. An increase in the second impedance control signal FIS2 results in an increase in the impedance of the pull-up circuit 122, and a reduction in the second impedance control signal FIS2 results in a reduction in the impedance of the pull-up circuit 122. The second register 103 maintains the second impedance control signal FIS2 that controls the impedance of the pull-up circuit 122 at a substantially constant value to substantially equalize the third output voltage V3 to the reference voltage VOH. As a result, the impedance of the pull-up circuit of the ODT/output driver is substantially equalized to the calibrated impedance of the pull-up circuit 122 in response to the second impedance control signal FIS2.

Operations for calibrating the impedance of the ODT/output driver when operating as an ODT using the impedance calibration circuit 100 will now be described. These operations are similar to the above-described operations for calibrating the impedance of the ODT/output driver when operating as a driver. Thus, this method will be described with respect to the differences between the two methods. In order to calibrate the impedance of the ODT/output driver when operating as an ODT, the reference voltage VOH is applied to the first and second comparators 113 and 116, and the reference voltage VOL is applied to the third comparator 124. The resistance of the external resistor Rz connected to the calibration terminal 111 is set substantially equal to a desired impedance of the pull-down circuit of the ODT/output driver. For instance, the external resistor is selected to have a resistance of 120 Ω when calibrating the impedance of the ODT/output driver to 120 Ω. The desired impedance of the pull-down circuit of the ODT/output driver when the ODT/output driver operates as an ODT generally is different from that of the pull-down circuit of the ODT/output driver when the ODT/output driver operates as a driver. Therefore, the resistance of the external resistor Rz is selected to be substantially equal to the desired impedance of the pull-down circuit.

Figure 5:
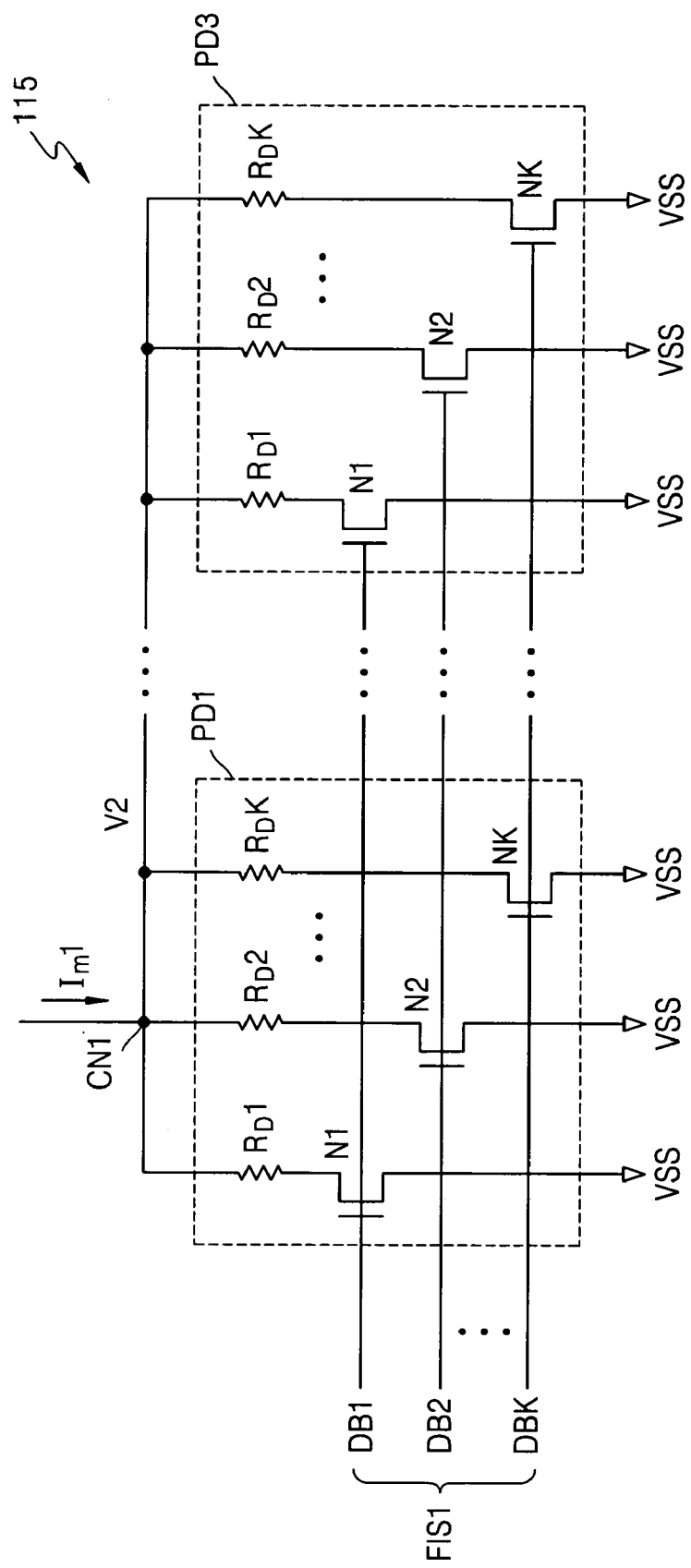
FIG. 5 is a detailed circuit diagram of a pull-down circuit that may be used in the circuit of FIG. 4.

FIG. 5 is a detailed circuit diagram of the pull-down circuit 115 of FIG. 4 (and the corresponding pull-down circuit of the ODT/output driver). The pull-down circuit 115 of FIG. 5 includes first through third sub-pull-down circuits PD1 through PD3. The number of sub-pull-down circuits of the pull-down circuit 115 may vary according to the number of sub-pull-down circuits of the pull-down circuit of the ODT/output driver. Each of the first through third sub-pull-down circuits PD1 through PD3 includes a plurality of NMOS transistors N1 through NK and a plurality of resistors $R_D1$ through $R_DK$ (K is an integer greater than 2). The NMOS transistors N1 through NK are turned on or off according to the levels DB1 through DBK of the first impedance control signal FIS1. The number of NMOS transistors and the number of resistors included in each of the first through third sub-pull-down circuits PD1 through PD3 are equal to the number of bits of the first impedance control signal FIS1. For instance, when the first impedance control signal FIS1 consists of 5 bits, i.e., DB1 through DB5, each of the first through third sub-pull-down circuits PD1 through PD3 includes five NMOS transistors N1 through N5 and five resistors $R_D1$ through $R_D5$. The values of the resistors $R_D1$ through $R_D5$ may be determined as follows:

$$R_D2 = 2R_D1, \quad (3)$$

$$R_D3 = 4R_D1,$$

$$R_D4 = 8R_D1,$$

$$R_D5 = 16R_D1$$

For instance, when the impedance of the ODT/output driver operating as a driver is calibrated and the values DB1 through DB5 of the first impedance control signal FIS1 are initially set to 00100, only the NMOS transistor N3 of each of the first through third sub-pull-down circuits PD1 through PD3 is turned on and the other NMOS transistors N1, N2, N4, and N5 are turned off. In this case, the second output voltage V2 generated at the second control node CN2 is determined by the resistors $R_D3$ of each of the first through third sub-pull-down circuits PD1 through PD3. When the values DB1 through DB5 are increased to 00101, only the NMOS transistors N3 and N5 of each of the first through third sub-pull-down circuits PD1 through PD3 are turned on and the other NMOS transistors N1, N2, and N4 are turned off. In this case, the second output voltage V2 is reduced since it is determined by a resistance smaller than the resistance of the resistor $R_D3$, i.e., a parallel combination of the impedances of the resistors $R_D3$ and $R_D5$. When the values DB1 through DB5 are reduced to 00011, only the NMOS transistors N4 and N5 of each of the first through third sub-pull-down circuits PD1 through PD3 are turned on, and the NMOS transistors N1, N2, and N3 are turned off.

In this case, the second output voltage V2 is increased since it is determined by a resistance that is greater than the resistance of the resistor $R_D3$, i.e., a parallel combination of the impedances of the resistors $R_D4$ and $R_D5$. When calibrating the impedance of the ODT/output driver acting as an ODT, it is possible to turn off switching circuits (not shown) so as to input the values DB1 through DB5 of the first impedance control signal FIS1 to only the first sub-pull-down circuit PD1, not the second and third sub-pull-down circuits PD2 and PD3.

Figure 6:
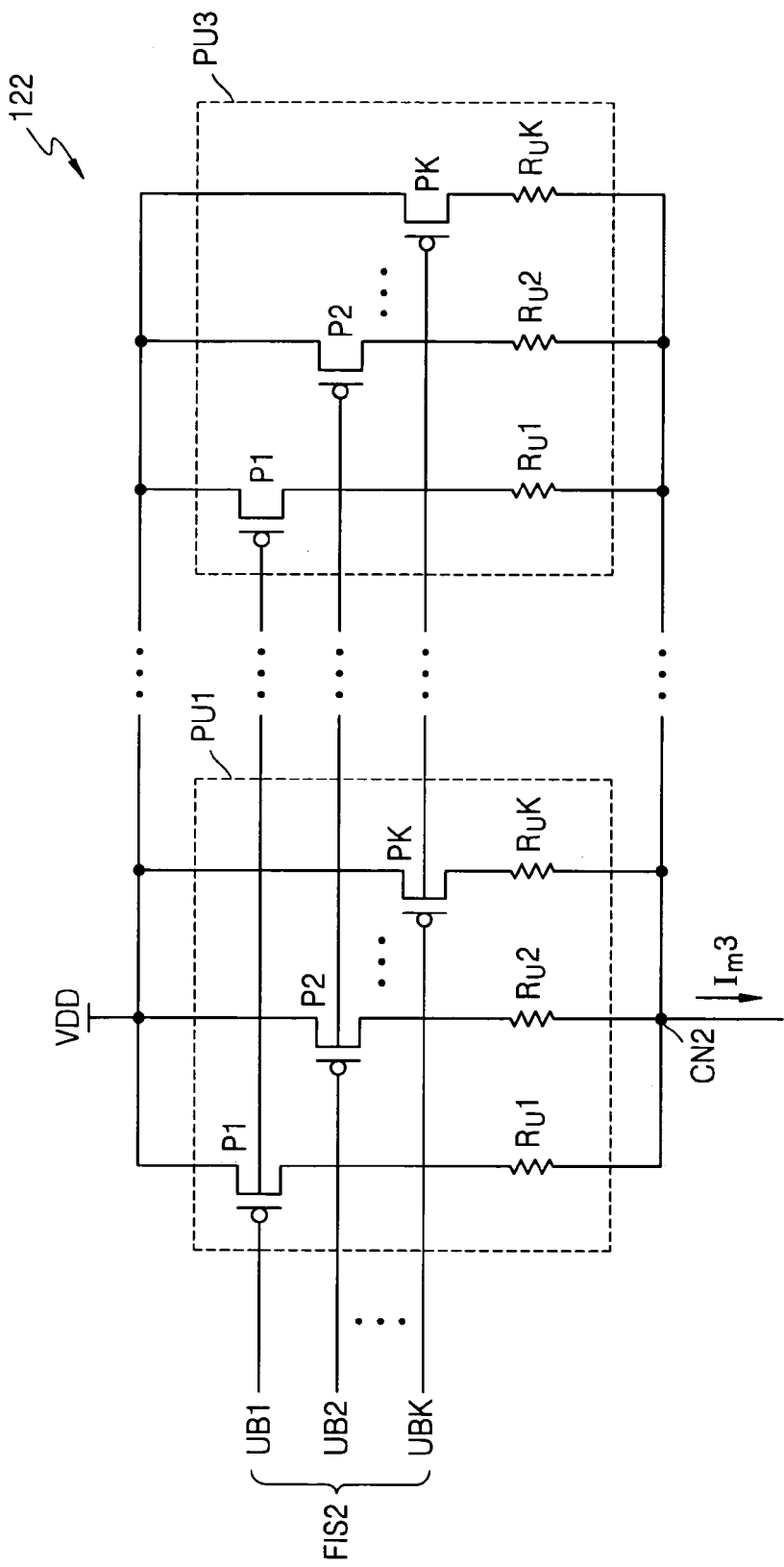
FIG. 6 is a detailed circuit diagram of a pull-up circuit that may be used in the circuit of FIG. 4.

FIG. 6 is a detailed circuit diagram of the pull-up circuit 122 of FIG. 4 (and the corresponding pull-up circuit of the ODT/output driver). The pull-up circuit 122 includes first through third sub-pull-up circuits PU1 through PU3. The number of sub-pull-up circuits of the pull-up circuit of the ODT/output driver may vary according to the number of sub-pull-up circuits of the pull-up circuit 122. Each of the first through third sub-pull-up circuits PU1 through PU3 includes a plurality of PMOS transistors P1 through PK and a plurality of resistors $R_U1$ through $R_UK$. The PMOS transistors P1 through PK are turned on or off according to values UB1 through UBK of the second impedance control signal FIS2. The number of PMOS transistors and the number of resistors included in each of the first through third sub-pull-up circuits PU1 through PU3 are equal to the number of bits UB1 through UB12 of the second impedance control signal FIS2. For instance, when the second impedance control signal FIS2 consists of 5 bits, i.e., UB1 through UB5, each of the first through third sub-pull-up circuits PU1 through PU3 includes five PMOS transistors P1 through P5 and five resistors $R_U1$ through $R_U5$. The values of the resistors $R_U1$ through $R_U5$ may be determined as follows:

$$R_U2 = 2R_U1, \quad (4)$$

$$R_U3 = 4R_U1,$$

$$R_U4 = 8R_U1,$$

$$R_U5 = 16R_U1$$

For instance, when the impedance of the ODT/output driver is calibrated and the values UB1 through UB5 of the second impedance control signal FIS2 are initially set to 11011, only the PMOS transistor P3 of each of the first through third sub-pull-up circuits PU1 through PU3 is turned on, and the other PMOS transistors P1, P2, P4, and P5 are turned off. In this case, the impedance between the internal voltage VDD and the second control node CN2 is determined by the resistor $R_U3$ of each of the sub-pull-up circuits PU1 through PU3. When the values UB1 through UB5 are increased to 11100, the PMOS transistors P4 and P5 of each of the first through third sub-pull-up circuits PU1 through PU3 are turned on, and the PMOS transistors P1, P2, and P3 are turned off. In this case, the impedance between the internal voltage VDD and the second control node CN2 is increased since it is determined by a resistance that is greater than the resistance of the resistor $R_U3$, that is, a parallel sum of the impedances of the resistors $R_U4$ and $R_U5$. When the values UB1 through UB5 are reduced to 11010, the PMOS transistors P3 and P5 of each of the first through third sub-pull-up circuits PU1 through PU3 are turned on, and the PMOS transistors P1, P2, and P4 are turned off.

In this case, the impedance between the internal voltage VDD and the second control node CN2 is reduced since it is determined by a resistance that is smaller than the resistance of the resistor $R_U3$, i.e., a parallel sum of the impedances of the resistors $R_D3$ and $R_D5$. When calibrating the impedance of the ODT/output driver acting as an ODT, it is possible to turn off switching circuits (not shown) so as to input the values UB1 through UB5 of the second impedance control signal FIS2 to only the first sub-pull-up circuit PU1.

Figure 7:
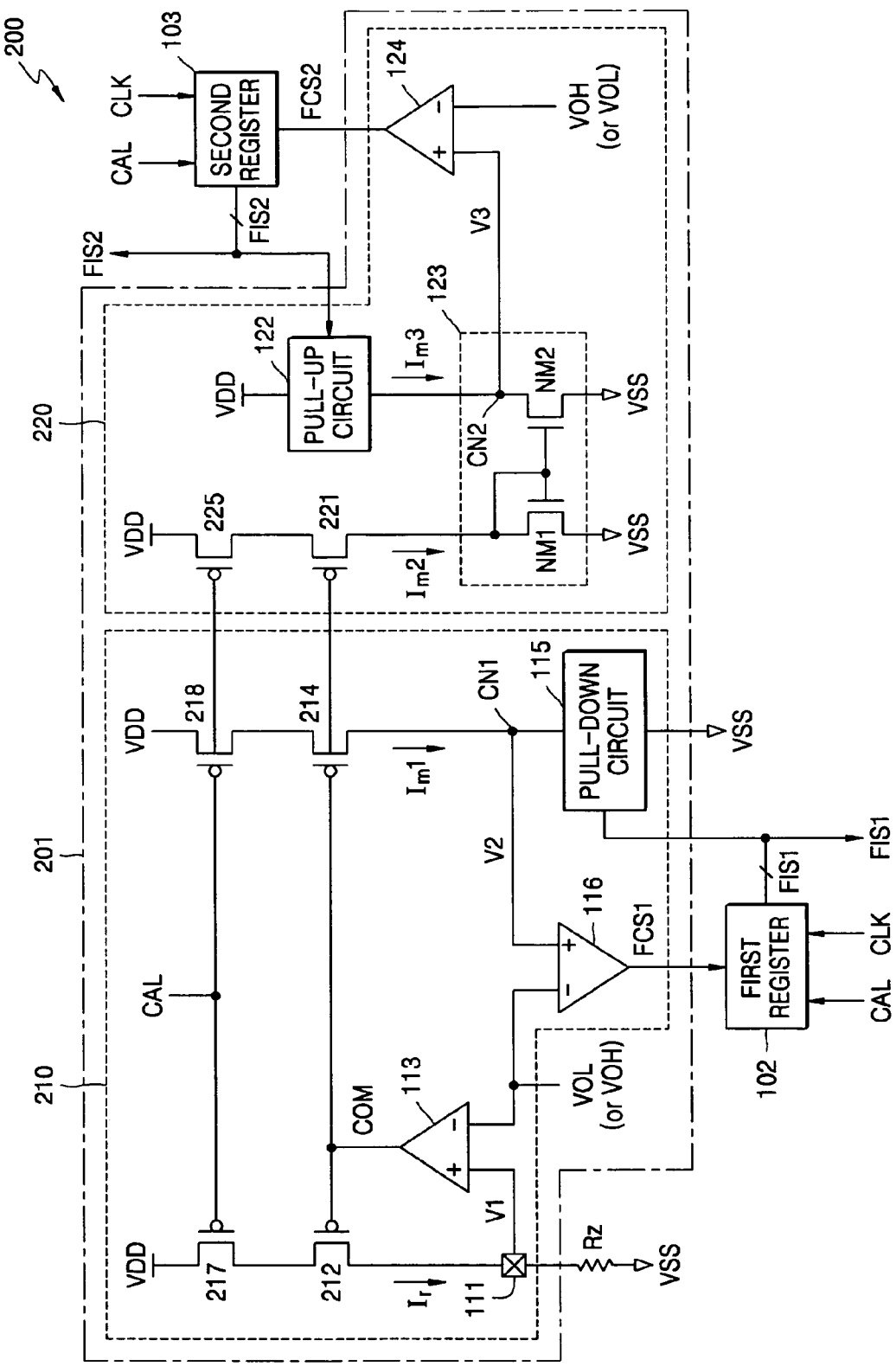
FIG. 7 is a block diagram of an impedance calibration circuit according to further embodiments of the present invention.

FIG. 7 is a block diagram of an impedance calibration circuit 200 according to further embodiments of the present invention. The impedance calibration circuit 200 includes a calibration circuit 201, a first register 102, and a second register 103. Like elements of the impedance calibration circuit 200 and the impedance calibration circuit 100 of FIG. 4 are indicated by like reference numerals, and further description of these elements will be omitted in light of the foregoing description of FIG. 4. First through third current sources 212, 214, and 221 and first through third switching circuits 217, 218, and 225 in the impedance calibration circuit are PMOS transistors.

Figure 8:
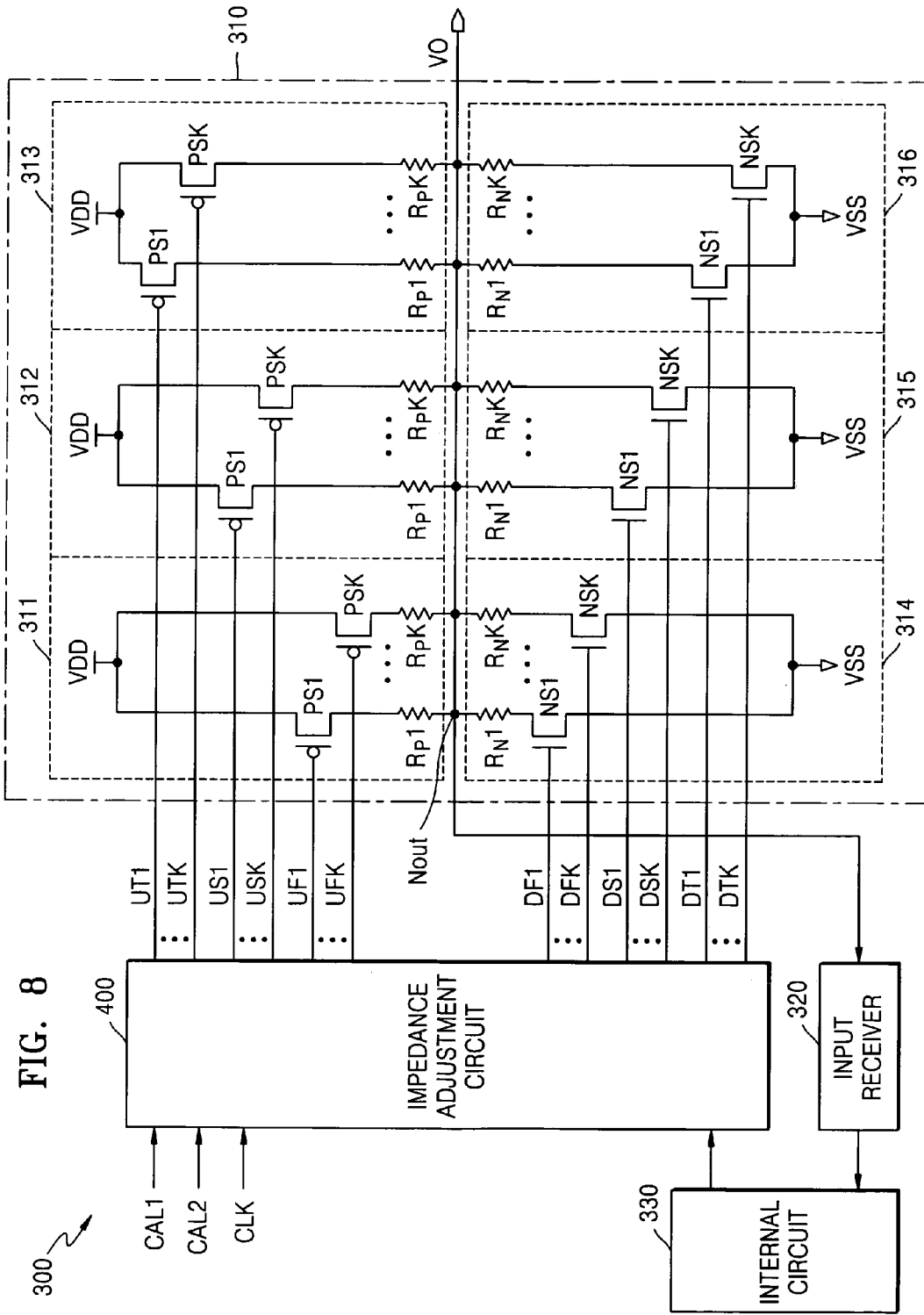
FIG. 8 is a circuit diagram of a semiconductor device with an impedance adjustment circuit according to additional embodiments of the present invention.

FIG. 8 is a detailed circuit diagram of a semiconductor device 300 with an impedance adjustment circuit 400 according to some embodiments of the present invention. The semiconductor device 300 includes an ODT/output driver 310, an input receiver 320, an internal circuit 330, and the impedance adjustment circuit 400. In response to a first calibration control signal CAL1 or a second calibration control signal CAL2, the impedance adjustment circuit 400 performs an impedance adjustment and outputs first selection signals UF1 through UFK, US1 through USK and UT1 through UTK and second selection signals DF1 through DFK, DS1 through DSK, and DT1 through DTK. The ODT/output driver 310 includes first through third pull-up circuits 311 through 313 and first through third pull-down circuits 314 through 316. The first through third pull-up circuits 311 through 313 are connected in parallel to an output node Nout, and the first through third pull-down circuits 314 through 316 are also connected in parallel to the output node Nout. Each of the first through third pull-up circuits 311 through 313 includes PMOS transistors PS1 through PSK and resistors $R_P1$ through $R_PK$. Each of the first through third pull-down circuits 314 through 316 includes NMOS transistors NS1 through NSK and resistors $R_N1$ through $R_NK$.

The PMOS transistors PS1 through PSK of the first pull-up circuit 311 are turned on or off in response to the first selection signals UF1 through UFK. The PMOS transistors PS1 through PSK of the second pull-up circuit 312 are turned on or off in response to the first selection signals US1 through USK. The PMOS transistors PS1 through PSK of the third pull-up transistor 313 are turned on or off in response to the first selection signals UT1 through UTK. The relationships among the resistances of the resistors $R_P1$ through $R_PK$ of each of the first through third pull-up circuits 311 through 313 may be expressed as follows:

$$R_P2=2R_P1,$$

$$R_P3=4R_P1,$$

...

...

...

$$R_PK=2^{K-1}R_P1 \quad (5)$$

The NMOS transistors NS1 through NSK of the first pull-down circuit 314 are turned on or off in response to the second selection signals DF1 through DFK. The NMOS transistors NS1 through NSK of the second pull-down circuit 315 are turned on or off in response to the second selection signals DS1 through DSK. The NMOS transistors NS1 through NSK of the third pull-down circuit 316 are turned on or off in response to the second selection signals DT1 through DTK. The relationships among the resistances of the resistors $R_N1$ through $R_NK$ of each of the first through third pull-down circuits 314 through 316 may be expressed as follows:

$$R_N2=2R_N1,$$

$$R_N3=4R_N1,$$

...

...

...

$$R_NK=2^{K-1}R_N1 \quad (6)$$

Figure 3A:
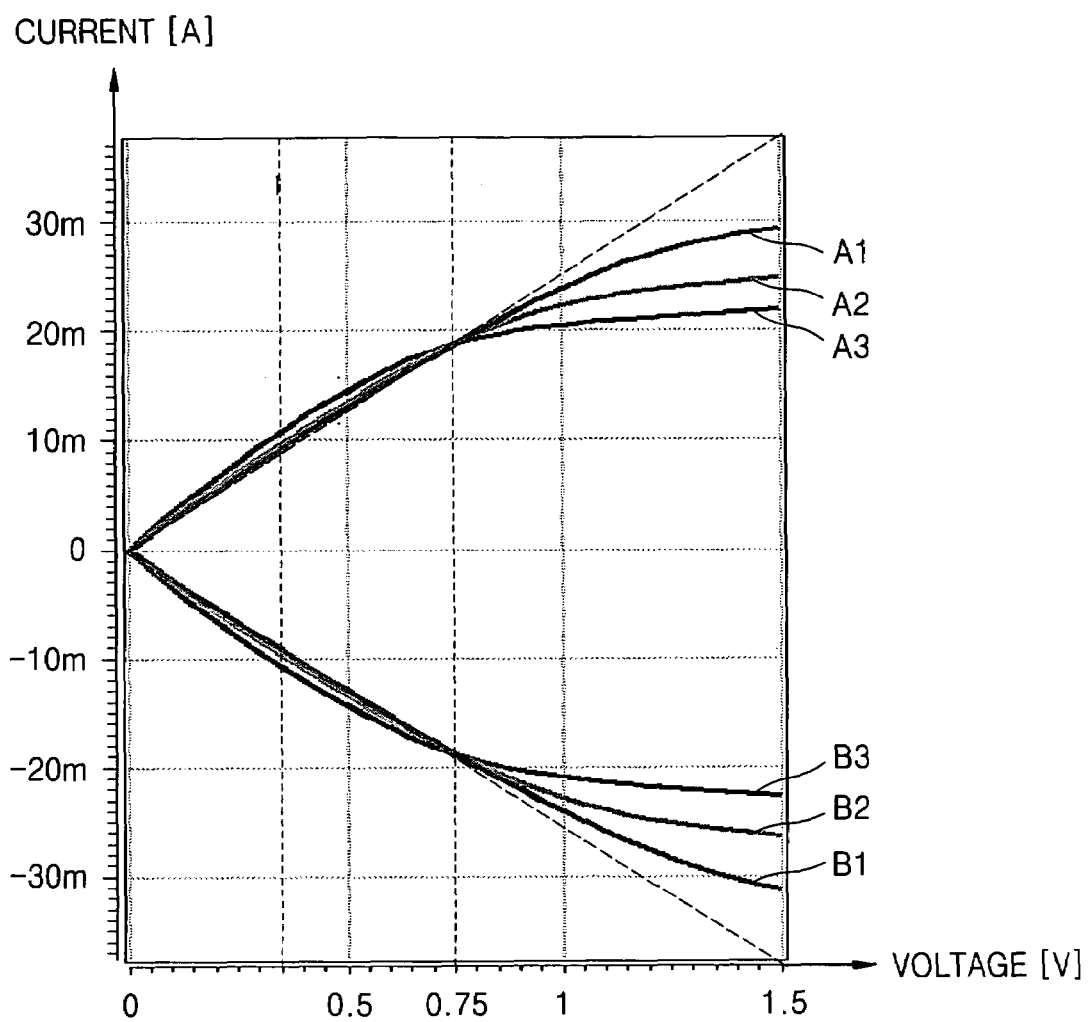
FIG. 3A is a graph illustrating the current-voltage (I-V) characteristics of output drivers whose impedances are calibrated using a conventional method.
Figure 3B:
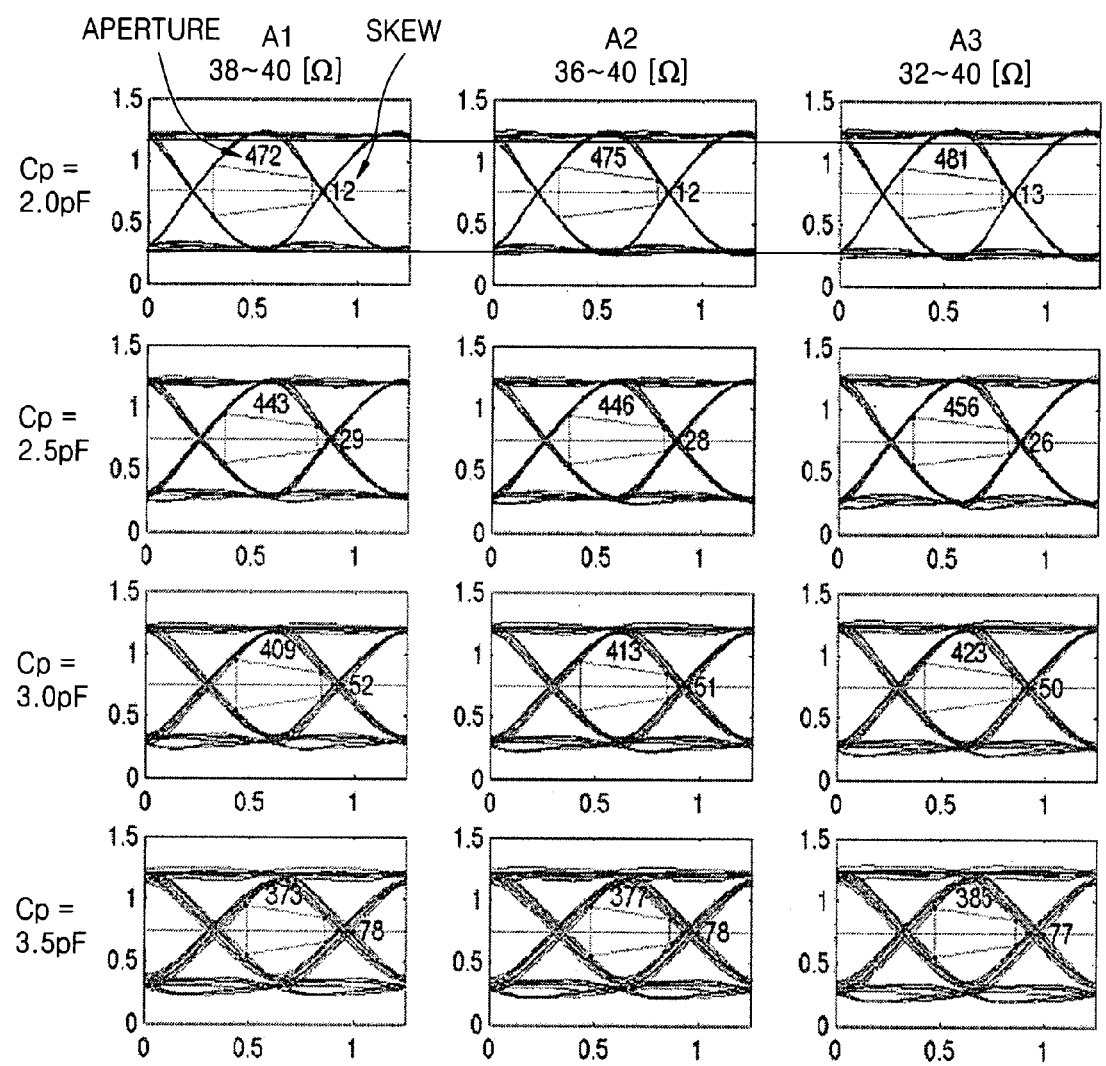
FIG. 3B illustrates the result of a simulation in which the impedances of output drivers were calibrated using a conventional method.
Figure 9:
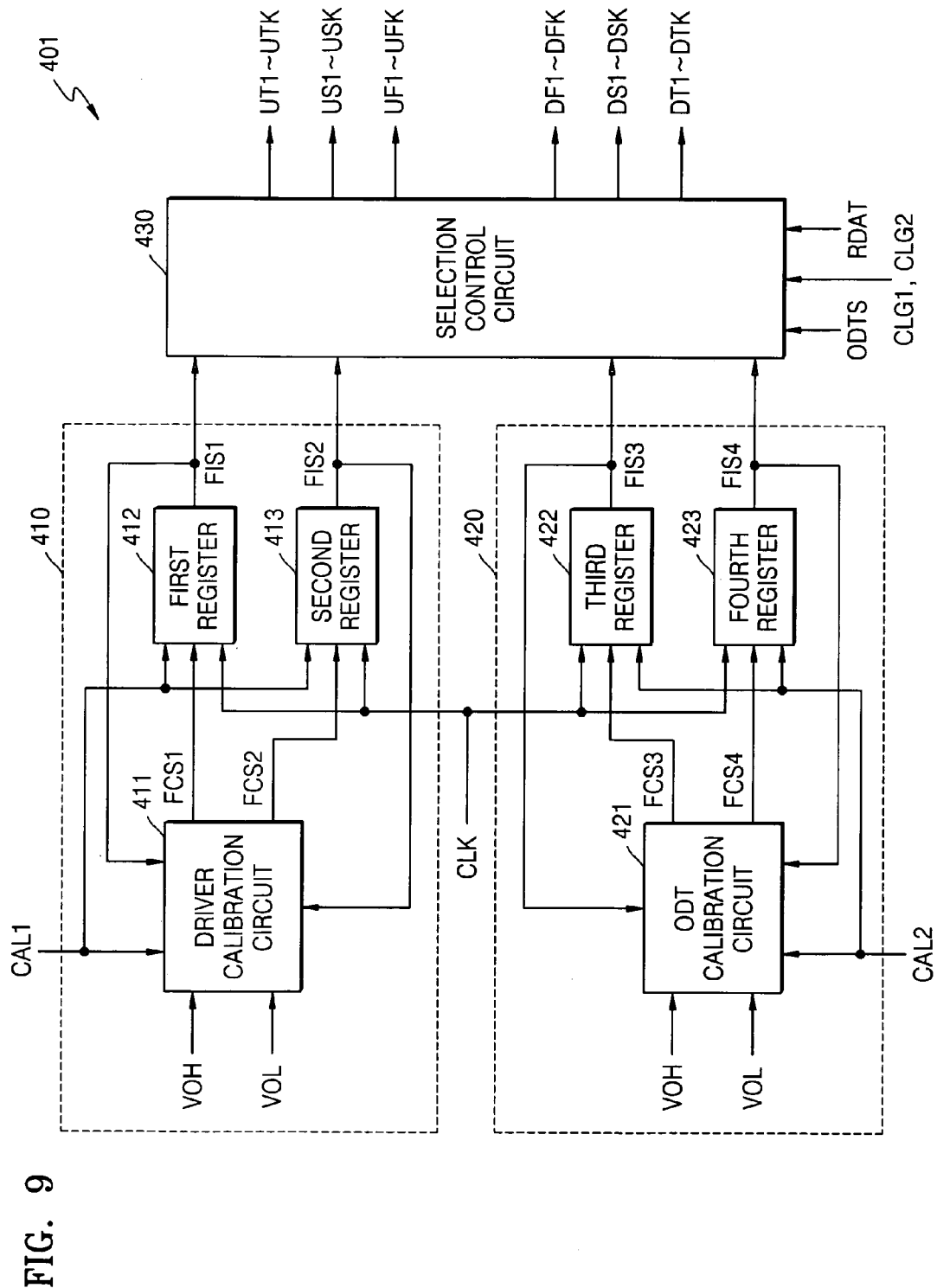
FIG. 9 is a block diagram of an impedance adjustment circuit according to yet further embodiments of the present invention.

FIG. 9 is a block diagram of an impedance adjustment circuit 401 according to further embodiments of the present invention. The impedance adjustment circuit 401 includes a first impedance calibration circuit 410, a second impedance calibration circuit 420, and a selection control circuit 430. The first impedance calibration circuit 410 includes a driver calibration circuit 411, a first register 412, and a second register 413. The driver calibration circuit 411 and the first and second registers 412 and 413 are enabled or disabled in response to a first calibration control signal CAL1. The construction and operations of the driver calibration circuit 411 and the first and second registers 412 and 413 are similar to those of the calibration circuit 101 and the first and second registers 102 and 103 of FIG. 4, respectively. When the driver calibration circuit 411 is enabled, it performs a calibration operation using reference voltages VOL and VOH, and outputs first and second calibration signals FCS1 and FCS2. The reference voltages VOL and VOH are equal to a minimum level and a maximum level of the voltage VO generated at the output node Nout shown in FIG. 8 when an ODT/output driver such as that shown in FIG. 3 acts as a driver. The reference voltage VOH is a maximum level of the voltage VO generated at the output node Nout when the ODT/output driver acts as an ODT. The first register 412 outputs a first impedance control signal FIS1 in response to the first calibration signal FCS1, and the second register 413 outputs a second impedance control signal FIS2 in response to the second calibration signal FCS2.

The second impedance calibration circuit 420 includes an ODT calibration circuit 421, a third register 422, and a fourth register 423. The ODT calibration circuit 421, the third register 422, and the fourth register 423 are enabled or disabled in response to a second calibration control signal CAL2. The construction and operations of the ODT calibration circuit 421 and the third and fourth registers 422 and 423 are similar to those of the calibration circuit 101 and the first and second registers 102 and 103 of FIG. 4, respectively. When the ODT calibration circuit 421 is enabled, it performs a calibration operation using the reference voltages VOL and VOH, and outputs third and fourth calibration signals FCS3 and FCS4. The third register 422 outputs a third impedance control signal FIS3 in response to the third calibration signal FCS3, and the fourth register 423 outputs a fourth impedance control signal FIS4 in response to the fourth calibration signal FCS4.

The selection control circuit 430 outputs first selection signals UF1 through UFK, US1 through USK, and UT1 through UTK, and second selection signals DF1 through DFK, DS1 through DSK, and DT1 through DTK, in response to the first through fourth impedance control signals FIS1 through FIS4, a selection control signal ODTS, first and second control logic signals CLG1 and CLG2, and an internal data signal RDAT.

Figure 10:
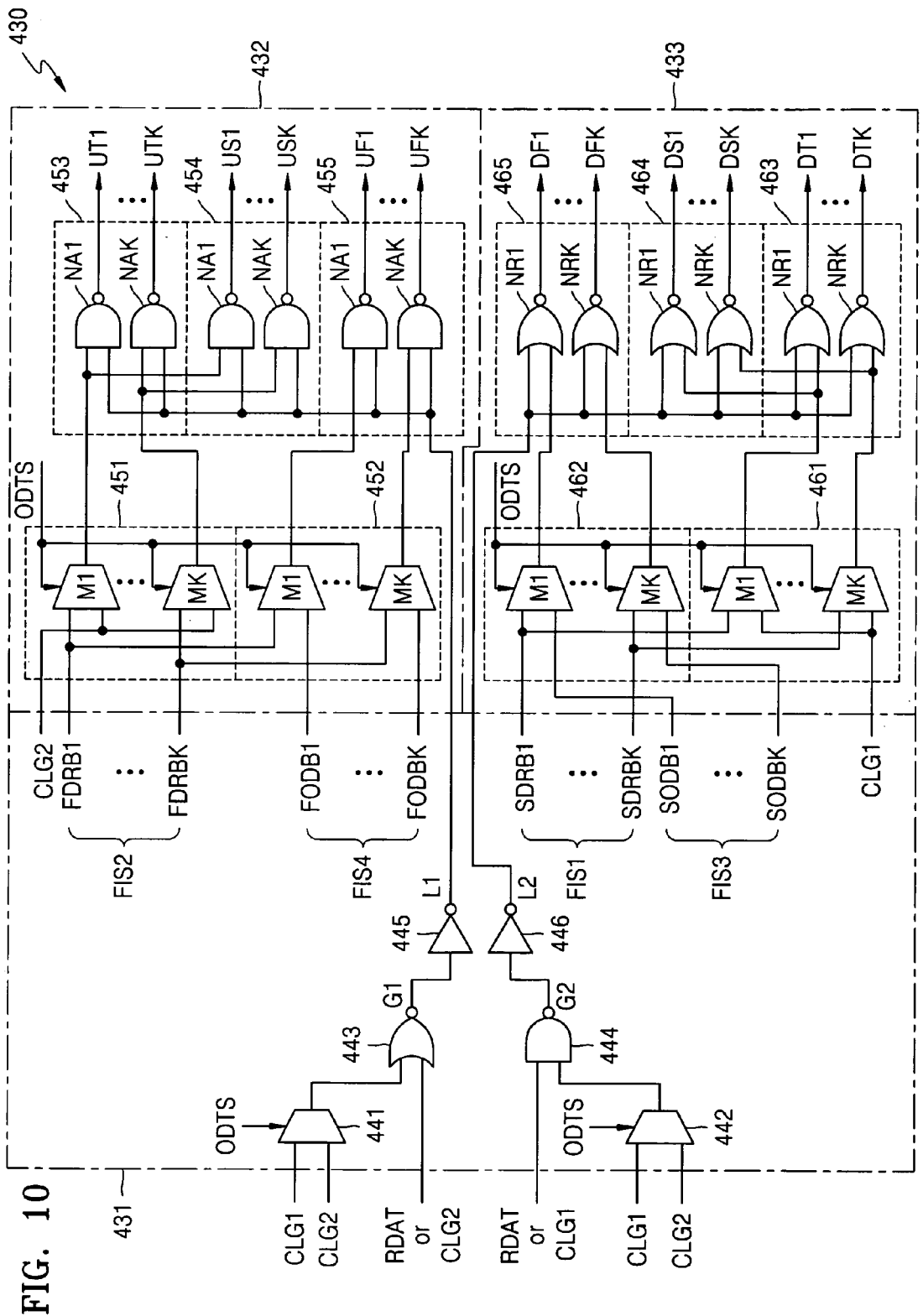
FIG. 10 is a detailed circuit diagram of a selection control circuit that may be used in the circuit of FIG. 9.

FIG. 10 is a detailed circuit diagram of the selection control circuit 430 of FIG. 9. The selection control circuit 430 includes a first logic circuit 431, a second logic circuit 432, and a third logic circuit 433. The first logic circuit 431 includes multiplexers 441 and 442, a NOR gate 443, a NAND gate 444, and inverters 445 and 446. The multiplexer 441 outputs one of a first control logic signal CLG1 and a second control logic signal CLG2 in response to the selection control signal ODTS. More specifically, the multiplexer 441 outputs the first control logic signal CLG1 when the selection control signal ODTS is enabled, and outputs the second control logic signal CLG2 when the selection control signal ODTS is disabled. In this case, it is preferable that the first logic control signal CLG1 goes high and the second logic control signal CLG2 goes low. When the ODT/output driver 310 acts as an ODT, the selection control signal ODTS is enabled.

The multiplexer 442 outputs one of the first and second control logic signals CLG1 and CLG2 in response to the selection control signal ODTS. Specifically, the multiplexer 442 outputs the second control logic signal CLG2 when the selection control signal ODTS is enabled, and outputs the first control logic signal CLG1 when the selection control signal ODTS is disabled.

The NOR gate 443 outputs a logic signal G1 in response to a signal output from the multiplexer 441, and the internal data signal RDAT or the second control logic signal CLG2. When the ODT/output driver 310 enters a high impedance state when it acts as an ODT, the second control logic signal CLG2, not the internal data signal RDAT, is input to the NOR gate 443. When the ODT/output driver 310 acts as a driver, the internal data signal RDAT is input to the NOR gate 443. When the ODT/output driver 310 acts as an ODT, the NOR gate 443 outputs the logic signal G1 at a logic low level. The inverter 445 inverts the logic signal G1 and outputs a first control signal L1 as the result of inversion.

The NAND gate 444 outputs a logic signal G2 in response to a signal output from the multiplexer 442, and the internal data signal RDAT or the first control logic signal CLG1. When the ODT/output driver 310 enters the high impedance state when it acts as an ODT, the first control logic signal CLG1, not the internal data signal RDAT, is input to the NAND gate 444. Also, when the ODT/output driver 310 acts as a driver, the internal data signal RDAT is input to the NAND gate 444. When the ODT/output driver 310 acts as an ODT, the NAND gate 444 outputs the logic signal G2 at a logic high level. The inverter 446 inverts the logic signal G2, and outputs a second control signal L2 as the result of inversion.

The second logic circuit 432 includes first and second selection circuits 451 and 452 and first through third output circuits 453, 454, and 455. Each of the first and second selection circuits 451 and 452 includes multiplexers M1 through MK. The multiplexers M1 through MK of the first selection circuit 451 respectively select and output either bits FDRB1 through FDRBK of the second impedance control signal FIS2, or the second control logic signal CLG2 in response to the selection control signal ODTS. In detail, when the selection control signal ODTS is enabled, the multiplexers M1 through MK of the first selection circuit 451 select and output the second control logic signal CLG2. The multiplexers M1 through MK of the second selection circuit 452 respectively select and output either bits FDRB1 through FDRBK of the second impedance control signal FIS2, or bits FODB1 through FODBK of the fourth impedance control signal FIS4 in response to the selection control signal ODTS. In detail, when the selection control signal ODTS is enabled, the multiplexers M1 through MK of the second selection circuit 452 select and output the bits FODB1 through FODBK of the fourth impedance control signal FIS4. Each of the first through third output circuits 453, 454, and 455 includes NAND gates NA1 through NAK. The NAND gates NA1 through NAK of the first output circuit 453 receive the signals output from the first selection circuit 451, and the first control signal L1, and respectively output first selection signals UT1 through UTK, respectively. The NAND gates NA1 through NAK of the second output circuit 454 respectively output first selection signals US1 through USK in response to signals output from the first selection circuit 451 and the first control signal L1. The NAND gates NA1 through NAK of the third output circuit 455 respectively output first selection signals UF1 through UFK in response to signals output from the second selection circuit 452 and the first control signal L1.

When the ODT/output driver 310 acts as an ODT, the first selection signals UT1 through UTK output from the first output circuit 453 are maintained at a logic high level, and the first selection signals US1 through USK output from the second output circuit 454 are also maintained at a logic high level. Also, some of the signals, which are output from the third output circuit 455 in response to the signals output from the second selection circuit 452 and the first control signal L1, are at a logic low level and the other signals are at a logic high level. As a result, all the PMOS transistors PS1 through PSK of the second and third pull-up circuits 312 and 313 of the ODT/output driver 310 are turned off, and some of the PMOS transistors PS1 through PSK of the first pull-up circuit 311 are turned on.

The third logic circuit 433 includes first and second selection circuits 461 and 462 and first through third output circuits 463, 464, and 465. Each of the first and second selection circuits 461 and 462 includes multiplexers M1 through MK. The multiplexers M1 through MK of the first selection circuit 461 respectively select and output either bits SDRB1 through SDRBK of the first impedance control signal FIS1, or the first control logic signal CLG1 in response to the selection control signal ODTS. When the selection control signal ODTS is enabled, the multiplexers M1 through MK of the first selection circuit 461 select and output the first control logic signal CLG1. The multiplexers M1 through MK of the second selection circuit 462 respectively select and output either bits SDRB1 through SDRBK of the first impedance control signal FIS1, or bits SODB1 through SODBK of the third impedance control signal FIS3 in response to the selection control signal ODTS. When the selection control signal ODTS is enabled, the multiplexers M1 through MK of the second selection circuit 462 select and output the bits SODB1 through SODBK of the third impedance control signal FIS3.

Each of the first through third output circuits 463, 464, and 465 includes NOR gates NR1 through NRK. The NOR gates NR1 through NRK of the first output circuit 463 receive corresponding signals output from the first selection circuit 461 and the second control signal L2, and respectively output second selection signals DT1 through DTK, respectively. The NOR gates NR1 through NRK of the second output circuit 464 receive corresponding signals output from the first selection circuit 461 and the second control signal L2, and respectively output second selection signals DS1 through DSK. The NOR gates NR1 through NRK of the third output circuit 465 receive the corresponding signals output from the second selection circuit 462 and the second control signal L2, and respectively output second selection signals DF1 through DFK.

When the ODT/output driver 310 acts as an ODT, the second selection signals DT1 through DTK output from the first output circuit 463 are maintained at a logic low level, and the second selection signals DS1 through DSK output from the second output circuit 464 are also respectively at a logic low level. Some of the second selection signals DF1 through DFK output from the third output circuit 465 in response to the signals output from the second selection signal 462 and the second control signal L2 are at a logic high level, and the other signals are at a logic low level. Accordingly, all the NMOS transistors NS1 through NSK of the second and third pull-down circuits 315 and 316 of the ODT/output driver 310 are turned off, and some of the NMOS transistors NS1 through NSK of the first pull-down circuit 314 are turned on.

Figure 11:
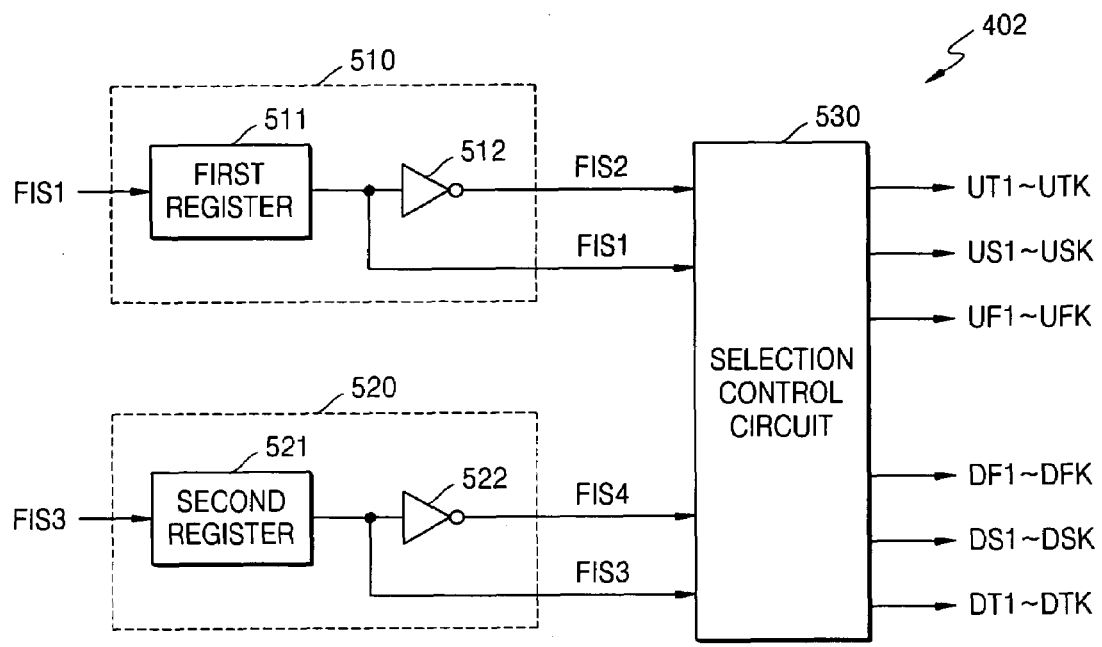
FIG. 11 is a block diagram of an impedance adjustment circuit according to additional embodiments of the present invention.

FIG. 11 is a block diagram of an impedance adjustment circuit 402 according to additional embodiments of the present invention. The impedance adjustment circuit 402 includes a first impedance calibration circuit 510, a second impedance calibration circuit 520, and a selection control circuit 530. The first impedance calibration circuit 510 includes a first register 511 and an inverter 512. The first register 511 stores and outputs a first impedance control signal FIS1 received from an external control device (not shown) via a channel. The inverter 512 inverts the first impedance control signal FIS1, and outputs a second impedance control signal FIS2 as the result of inversion. The values of the first and second impedance control signals FIS1 and FIS2 are equal to the values of the first and second impedance control signals FIS1 and FIS2 obtained by performing a calibration operation using the first impedance calibration circuit 410 of FIG. 9. The second impedance calibration circuit 520 includes a second register 521 and an inverter 522. The second register 521 stores and outputs a third impedance control signal FIS3 received from the external control device via the channel. The inverter 522 inverts the third impedance control signal FIS3, and outputs a fourth impedance control signal FIS4 as the result of inversion. The values of the third and fourth impedance control signals FIS3 and FIS4 are equal to the values of the third and fourth impedance control signals FIS3 and FIS4 obtained by performing a calibration operation using the second impedance calibration circuit 420 of FIG. 9. The constructions and operations of the selection control circuit 530 are similar to those of the selection control circuit 430 shown in FIGS. 9 and 10 and, therefore, further detailed description thereof will be omitted.

As described above, an impedance calibration circuit according to some embodiments of the present invention uses voltages, which are generated when an ODT/output driver operates, as reference voltages, thereby reducing the skew in a transmitted signal.

Figure 12:
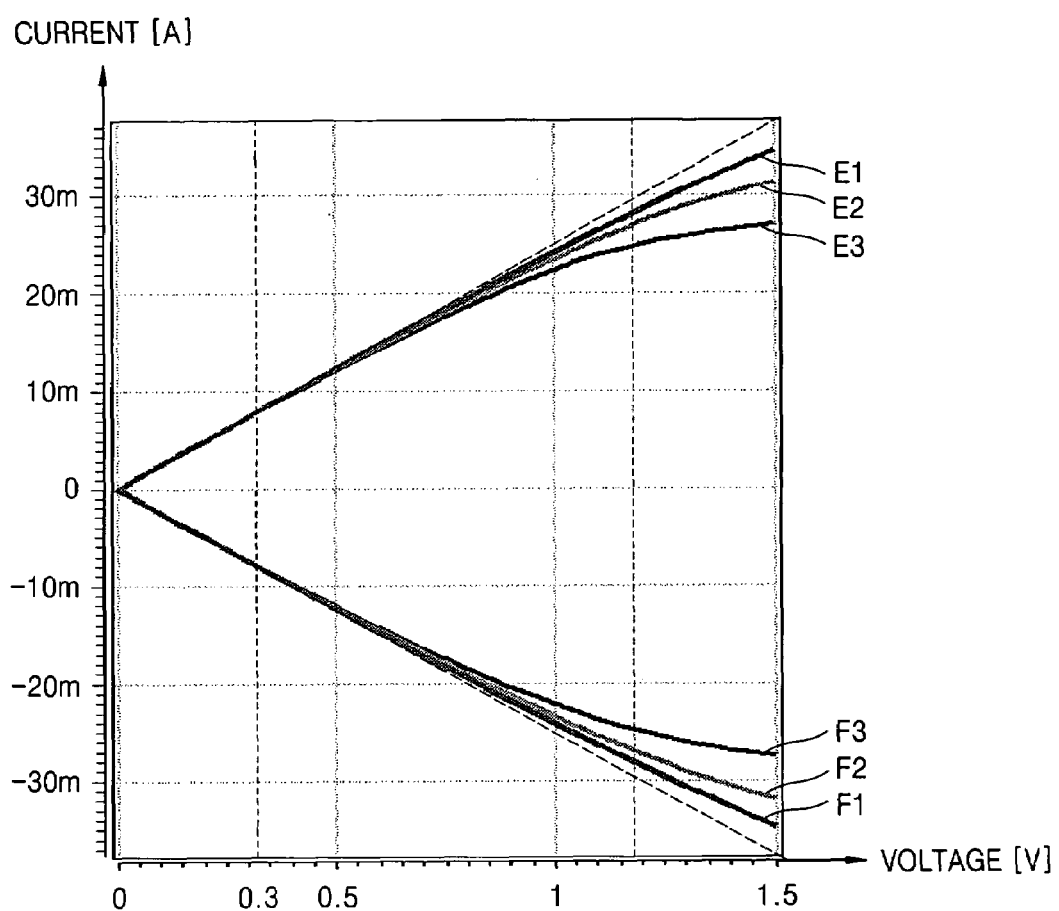
FIG. 12 is a graph illustrating operating characteristics of an output driver calibrated according to some embodiments of the present invention.

FIG. 12 is a graph illustrating the I-V characteristics of an output driver whose impedance is calibrated using operations for calibrating the impedance of an output driver according to some embodiments of the present invention. In FIG. 12, curves E1 through E3 and curves F1 through F3 show the I-V characteristics of pull-down circuits and pull-up circuits of output drivers whose impedances are calibrated as suggested in an embodiment of the present invention, respectively. In detail, the curves E1 and F1 show the I-V characteristics of output drivers with the best operating conditions, and the curves E3 and F3 show those of output drivers with the worst operating conditions. The curves E2 and F2 show the I-V characteristics of output drivers with intermediate operating conditions. Because the impedances of the output drivers are calibrated using one of the reference voltages VOL and VOH as suggested in certain embodiments of the present invention, the curves E1 through E3 intersect when the reference voltage VOL, for example, 0.3V, is used, and the curves F1 through F3 also intersect when the reference voltage VOL is applied.

Figure 13:
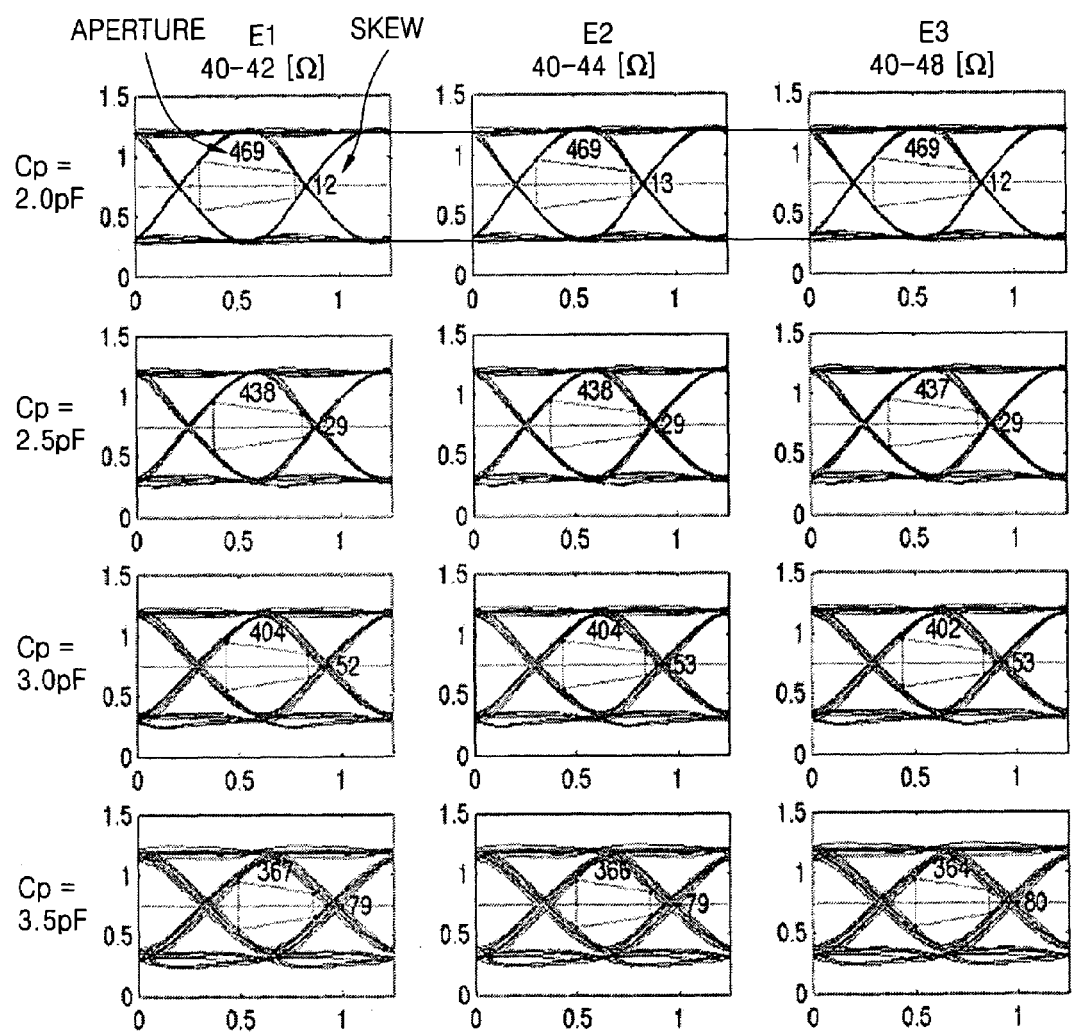
FIG. 13 illustrates simulation results for an output driver calibrated according to some embodiments of the present invention.

FIG. 13 illustrates the result of a simulation in which output drivers whose impedances were calibrated according to some embodiments of the present invention operated as drivers. In the simulation, variations in the skew and aperture of transmitted signals over parasitic capacitance $C_P$ on a channel were measured when voltages VOL of 0.3V were output from the output drivers and the impedances of pull-down circuits with I-V characteristics indicated by the curves E1 through E3 of FIG. 12 were calibrated to 40 Ω. Hereinafter, for convenience, the pull-down circuits with the I-V characteristics indicated by the curves E1 through E3 will be referred to as pull-down circuits E1 through E3, respectively. When voltages of 0.75V were output from the output drivers, the impedances of the pull-down circuits E1 through E3 were 42 Ω, 44 Ω, and 48 Ω, respectively. Referring to FIG. 13, an increase in the parasitic capacitance $C_P$ increases the skew of the pull-down circuits E1 through E3 but reduces the apertures thereon.

Referring to FIG. 13, when the parasitic capacitances $C_P$ were 2.0 pF, 2.5 pF, 3.0 pF, and 3.5 pF, the variations in the skew in the pull-down circuits E1 through E3 were 1 ps, 0 ps, 1 ps, and 1 ps, respectively. That is, the variations in the skew were less than 2 ps. When the parasitic capacitances $C_p$ were 2.0 pF, 2.5 pF, 3.0 pF, and 3.5 pF, variations in the aperture in the pull-down circuits E1 through E3 were 0 mV, 1 mV, 2 mV, and 3 mV, respectively. That is, the variations in the aperture were less than 4 mV. Therefore, techniques for calibrating the impedances of output drivers according to some embodiments of the present invention may remarkably reduce variations in the skew and aperture of the output drivers irrespective of the operating conditions of the output drivers, in contrast with when using a conventional method (see FIG. 3B). The simulation of FIG. 13 was performed in an environment in which problems related to cross talk were excluded. Therefore, when an output driver operates, variations in the skew and aperture therein may be further reduced.

Figure 14:
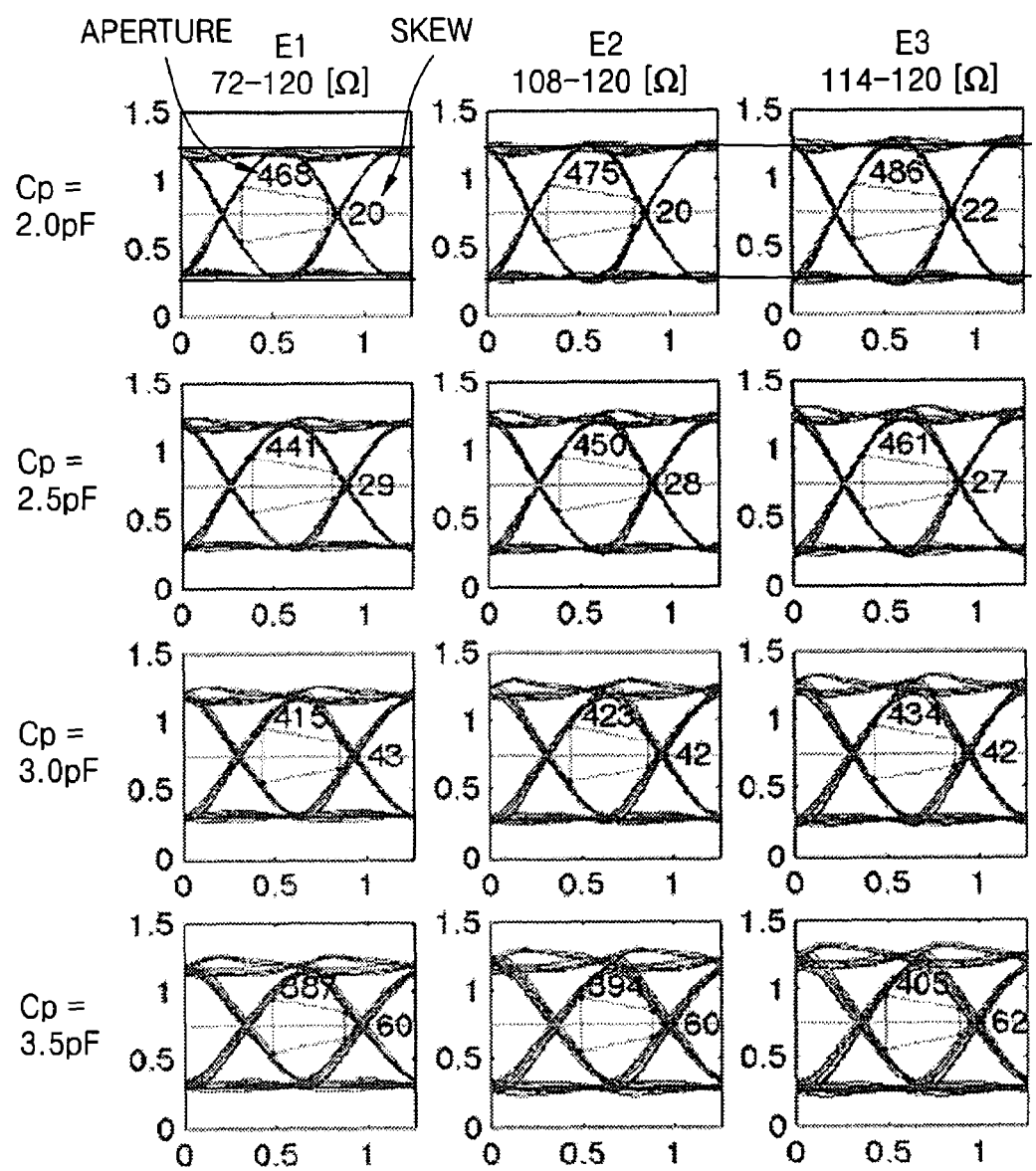
FIG. 14 illustrates simulation results for an output driver calibrated according to further embodiments of the present invention.

FIG. 14 illustrates the result of a simulation in which output drivers whose impedances were calibrated according to certain embodiments of the present invention operated as ODTs. In the simulation, variations in the skew and aperture of transmitted signals over parasitic capacitance $C_P$ on a channel were measured when voltages VOH of 1.2V were output from the output drivers and the impedances of pull-down circuits with I-V characteristics indicated by the curves E1 through E3 of FIG. 12 were calibrated to 120 Ω. When 0.3V were output from the output drivers, the impedances of the pull-down circuits E1 through E3 were 72 Ω, 108 Ω, and 114 Ω, respectively. Referring to FIG. 14, when the parasitic capacitances $C_P$ were 2.0 pF, 2.5 pF, 3.0 pF, and 3.5 pF, the variations in the skew in the pull-down circuits E1 through E3 were 2 ps, 2 ps, 1 ps, and 2 ps, respectively. That is, the variations in the skew were less than 3 ps. When the parasitic capacitances $C_P$ were 2.0 pF, 2.5 pF, 3.0 pF, and 3.5 pF, variations in the aperture in the pull-down circuits E1 through E3 were 18 mV, 20 mV, 19 mV, and 18 mV, respectively. That is, the variations in the aperture were less than 21 mV. Potential effects of the present invention are more apparent when the simulation result of FIG. 14 is compared with that of FIG. 15.

Figure 15:
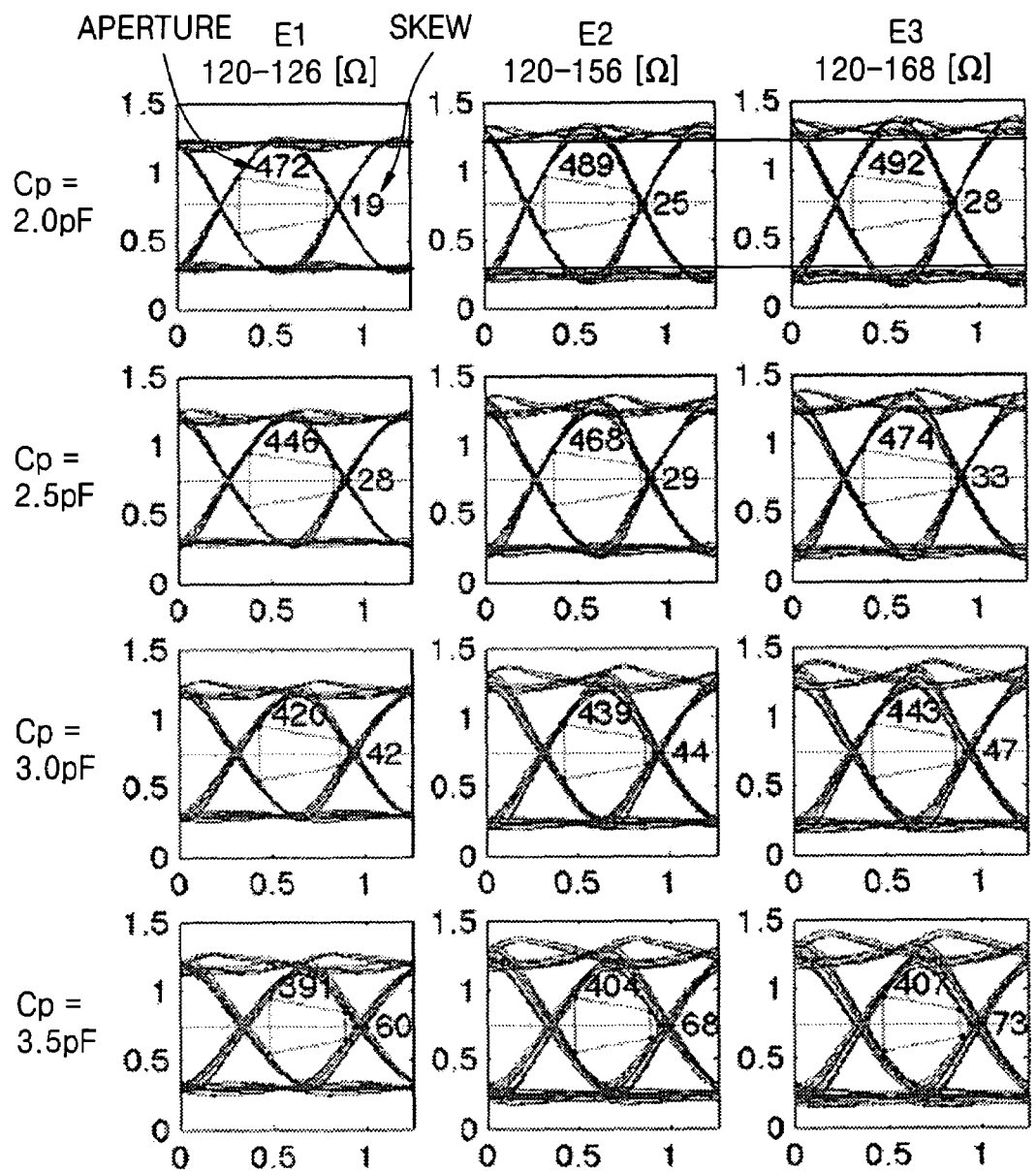
FIG. 15 illustrates simulation results using output drivers as ODTs, in contrast with the result of simulation of FIG. 14.

FIG. 15 illustrates the result of simulation where output drivers acted as ODTs, compared to that of simulation of FIG. 14. In the simulation of FIG. 15, variations in the skew and aperture of transmitted signals over parasitic capacitance $C_P$ on a channel were measured when voltages VOL of 0.3V were output from the output drivers and the impedances of pull-down circuits with I-V characteristics indicated by the curves E1 through E3 of FIG. 12 were calibrated to 120 Ω. When voltages of 0.75V were output from the output drivers, the impedances of the pull-down circuits E1 through E3 were 126 Ω, 156 Ω, and 168 Ω, respectively. Referring to FIG. 15, when the parasitic capacitances $C_P$ were 2.0 pF, 2.5 pF, 3.0 pF, and 3.5 pF, the variations in the skew in the pull-down circuits E1 through E3 are 9 ps, 5 ps, 5 ps, and 13 ps, respectively. That is, the variations in the skew were less than 14 ps. When the parasitic capacitances $C_P$ were 2.0 pF, 2.5 pF, 3.0 pF, and 3.5 pF, variations in the aperture in the pull-down circuits E1 through E3 were 20 mV, 28 mV, 23 mV, and 16 mV, respectively. That is, the variations in the aperture were less than 29 mV. The variations in the skew and aperture illustrated in FIG. 14 are far less than the variations in the skew and aperture illustrated in FIG. 15. Accordingly, when an output driver acts as an ODT, use of the reference voltage VOH may be preferable to the use of the reference voltage VOL when calibrating the impedance of pull-down circuits of the output driver.

As described above, an impedance calibration circuit, an integrated circuit with the same, and a method of calibrating the impedance of an output driver using the impedance calibration circuit according to various embodiments of the present invention may be advantageous in that the skew of a signal received from the output driver may be reduced, thus allowing stable transmission of the signal.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. An impedance adjustment circuit for controlling an impedance of a variable impedance circuit that comprises a pull-down circuit and a pull-up circuit connected to a signal node configured to be connected to an external source and/or load, the impedance adjustment circuit comprising:

a calibration circuit including a replica of the variable impedance circuit and configured to generate an impedance control signal for the variable impedance circuit based on a voltage generated at the replica of the variable impedance circuit in response to a reference current;

wherein the calibration circuit is configured to generate the reference current based on a reference resistor coupled thereto;

wherein the replica of the variable impedance circuit comprises a replica of the pull-down circuit and a replica of the pull-up circuit;

wherein the calibration circuit is configured to generate a current in the replica of the pull-down circuit and to apply a first impedance control signal to the pull-down circuit and to the replica of the pull-down circuit based on a voltage generated at the replica of the pull-down circuit in response to the current in the replica of the pull-down circuit; and wherein the calibration circuit is further configured to generate a current in the replica of the pull-up circuit and to apply a second impedance control signal to the pull-up circuit and to the replica of the pull-up circuit based on a voltage generated at the replica of the pull-up circuit in response to the current in the replica of the pull-up circuit.

2. An impedance adjustment circuit according to claim 1, wherein the pull-up circuit and the pull-down circuit are included in an output driver and/or an on-die terminator (ODT).

3. An impedance adjustment circuit according to claim 2, wherein the calibration circuit comprises:

a first current mirror configured to match the current in the reference resistor and the current in the replica of the pull-down circuit;

a first impedance control signal generator configured to generate the first impedance control signal responsive to the voltage of the replica of the pull-down circuit so as to substantially equalize the voltage of the replica of the pull-down circuit and a first reference voltage;

a second current mirror configured to match the current in the reference resistor and the current in the replica of the pull-up circuit; and a second impedance control signal generator configured to generate the second impedance control signal responsive to the voltage of the replica of the pull-up circuit so as to substantially equalize a voltage across the replica of the pull-up circuit and a second reference voltage.

4. An impedance adjustment circuit according to claim 3:

wherein the first impedance control signal generator comprises:

a first comparator configured to generate a first comparison signal responsive to a comparison of the voltage of the replica of the pull-down circuit to the first reference voltage; and a first register configured to increment and/or decrement the first impedance control signal responsive to the first comparison signal; and wherein the second impedance control signal generator comprises:

a second comparator configured to generate a second comparison signal responsive to a comparison of the voltage of the replica of the pull-up circuit to the second reference voltage; and a second register configured to increment and/or decrement the second impedance control signal responsive to the second comparison signal.

5. An impedance adjustment circuit according to claim 3, wherein the first reference voltage comprises a first one of a logic high reference voltage and a logic low reference voltage and wherein the second reference voltage comprises a second one of the logic high reference voltage and the logic low reference voltage.

6. An impedance adjustment circuit according to claim 5, wherein the pull-down circuit and the pull-up circuit are included in an output driver, wherein the first reference voltage comprises the logic low reference voltage, and wherein the second reference voltage comprises the logic high reference voltage.

7. An impedance adjustment circuit according to claim 5, wherein the pull-down circuit and the pull-up circuit are included in an ODT, wherein the first reference voltage comprises the logic high reference voltage, and wherein the second reference voltage comprises the logic low reference voltage.

8. An impedance adjustment circuit for controlling an impedance of a variable impedance circuit, the impedance adjustment circuit comprising:
a calibration circuit including a replica of the variable impedance circuit and configured to generate an impedance control signal for the variable impedance circuit based on a voltage generated at the replica of the variable impedance circuit in response to a reference current, wherein the calibration circuit is configured to generate the reference current based on a reference resistor coupled thereto and wherein the calibration circuit comprises:
a current mirror configured to match a current in the reference resistor and the current in the replica of the variable impedance circuit; and
an impedance control signal generator configured to generate the impedance control signal responsive to the voltage of the replica of the variable impedance circuit so as to substantially equalize the voltage of the replica of the variable impedance circuit and a reference voltage.

9. An impedance adjustment circuit according to claim 8, wherein the calibration circuit is configured to match a current in the replica of the variable impedance circuit and a current in the reference resistor.

10. An impedance adjustment circuit according to claim 8, wherein the variable impedance circuit comprises a pull-up circuit and/or a pull-down circuit coupled to an external signal node of an integrated circuit device.

11. An impedance adjustment circuit according to claim 8, wherein the impedance control signal generator comprises:
a comparator configured to generate a comparison signal responsive to a comparison of the voltage of the replica of the variable impedance circuit and the reference voltage; and
a register configured to increment and/or decrement the impedance control signal responsive to the comparison signal.

12. An impedance adjustment circuit according to claim 8, wherein the comparator comprises a first comparator, and wherein the current mirror comprises:
a first current source configured to generate the current in the reference resistor responsive to a current control signal;
a second current source configured to generate the current in the replica of the variable impedance circuit responsive to the current control signal; and
a second comparator configured to generate the current control signal responsive to a comparison of the reference voltage and a voltage generated at the reference resistor responsive to the current in the reference resistor.

13. An impedance adjustment circuit according to claim 8, wherein the comparator comprises a first comparator, wherein the reference voltage comprises a first reference voltage, and wherein the current mirror comprises:
a first current source configured to generate the current in the reference resistor responsive to a current control signal;
a second current source configured to generate the current in the replica of the variable impedance circuit responsive to the current control signal; and
a second comparator configured to generate the current control signal responsive to a comparison of a second reference voltage and a voltage generated at the reference resistor responsive to the current in the reference resistor.

14. An impedance adjustment circuit according to claim 8, wherein each of the variable impedance circuit and the replica of the variable impedance circuit comprises a plurality of resistors configured to be selectively coupled in parallel responsive to the impedance control signal.

15. An impedance adjustment circuit according to claim 8, wherein the calibration circuit is included in an integrated circuit device configured to be coupled to the reference resistor at an external terminal of the integrated circuit device.

16. An integrated circuit including an impedance adjustment circuit according to claim 8 in combination with the variable impedance circuit, wherein the variable impedance circuit comprises a pull-down circuit and/or a pull-up circuit coupled to an external signal node of the integrated circuit.

17. An integrated circuit device comprising:
a variable impedance pull-down circuit and a variable impedance pull-up circuit coupled to an external signal node;
a first calibration circuit configured to generate respective first and second impedance control signals for the variable impedance pull-down and pull-up circuits;
a second calibration circuit configured to generate respective third and fourth impedance control signals for the variable impedance pull-down and pull-up circuits; and
a selection circuit configured to receive the first, second, third and fourth impedance control signals, to apply the first and third impedance control signals to the respective variable impedance pull-up and pull-down circuits in response to a first state of a selection control signal, and to apply the second and fourth impedance control signals to the respective variable impedance pull-up and pull-down circuits in response to a second state of the selection control signal.

18. An integrated circuit device according to claim 17, wherein the first state of the selection control signal corresponds to operation of the variable impedance pull-down and pull-up circuits as an output driver, and wherein the second state of the selection control signal corresponds to operation of the variable impedance pull-down and pull-up circuits as an ODT.

19. An integrated circuit device according to claim 17:
wherein the first calibration circuit comprises a first replica of the pull-down circuit and a first replica of the pull-up circuit and is configured to generate respective ones of the first and second impedance control signals based on respective voltages generated at respective ones of the first replica of the pull-down circuit and the first replica of the pull-up circuit in response to a first reference current; and
wherein the second calibration circuit comprises a second replica of the pull-down circuit and a second replica of the pull-up circuit and is configured to generate respective ones of the third and fourth impedance control signals based on respective voltages generated at respective ones of the second replica of the pull-down circuit and the second replica of the pull-up circuit in response to a second reference current.

20. An integrated circuit device according to claim 19, wherein the first and second calibration circuits are configured to generate the first and second reference currents based on respective first and second reference resistors coupled thereto.

21. An integrated circuit device according to claim 20:
wherein the first calibration circuit is configured to match a current in the first replica of the pull-down circuit and a current in the first reference resistor and to generate the first impedance control signal based on a voltage generated at the first replica of the pull-down circuit in response to the current in the first replica of the pull-down circuit;
wherein the first calibration circuit is further configured to match a current in the first replica of the pull-up circuit and the current in the first reference resistor and to generate the second impedance control signal based on a voltage generated at the first replica of the pull-up circuit in response to the current in the first replica of the pull-up circuit;
wherein the second calibration circuit is configured to match a current in the second replica of the pull-down circuit and a current in the second reference resistor and to generate the third impedance control signal based on a voltage generated at the second replica of the pull-down circuit in response to the current in the second replica of the pull-down circuit; and
wherein the second calibration circuit is further configured to match a current in the second replica of the pull-up circuit and the current in the second reference resistor and to generate the fourth impedance control signal based on a voltage generated at the second replica of the pull-up circuit in response to the current in the second replica of the pull-up circuit.

22. An integrated circuit device according to claim 17:
wherein the first calibration circuit comprises:
a first register configured to store the first impedance control signal; and
a first inverter configured to receive the stored first impedance control signal and to invert the stored first impedance control signal to generate the second impedance control signal; and
wherein the second calibration circuit comprises:
a second register configured to store the third impedance control signal; and
a second inverter configured to receive the stored third impedance control signal and to invert the stored third impedance control signal to generate the fourth impedance control signal.

23. A method of controlling an impedance of a variable impedance circuit that comprises a pull-down circuit and a pull-up circuit coupled to an external signal node of an integrated circuit device, the method comprising:
generating a current in a replica of the pull-down circuit in response to a reference current;
applying a first impedance control signal to the pull-down circuit and the replica of the pull-down circuit based on a voltage generated at the replica of the pull-down circuit in response to the current in the replica of the pull-down circuit;
generating a current in a replica of the pull-up circuit in response to the reference current; and
applying a second impedance control signal to the pull-up circuit and the replica of the pull-up circuit based on a voltage generated at the replica of the pull-up circuit in response to the current in the replica of the pull-up circuit.

24. A method according to claim 23, wherein the pull-up circuit and the pull-down circuit are included in an output driver and/or an on-die terminator (ODT).

25. A method according to claim 23, comprising:
generating the reference current based on a reference resistor;
matching the reference current in the reference resistor and the current in the replica of the pull-down circuit;
generating the first impedance control signal responsive to the voltage of the replica of the pull-down circuit so as to substantially equalize the voltage of the replica of the pull-down circuit and a first reference voltage;
matching the reference current in the reference resistor and the current in the replica of the pull-up circuit; and
generating the second impedance control signal responsive to the voltage of the replica of the pull-up circuit so as to substantially equalize a voltage across the replica of the pull-up circuit and a second reference voltage.

26. A method according to claim 25, wherein the first reference voltage comprises a first one of a logic high reference voltage and a logic low reference voltage and wherein the second reference voltage comprises a second one of the logic high reference voltage and the logic low reference voltage.

27. A method according to claim 26, wherein the pull-down circuit and the pull-up circuit are included in an output driver, wherein first reference voltage comprises the logic low reference voltage, and wherein the second reference voltage comprises the logic high reference voltage.

28. A method according to claim 26, wherein the pull-down circuit and the pull-up circuit are included in an ODT, wherein the first reference voltage comprises the logic high reference voltage, and wherein the second reference voltage comprises the logic low reference voltage.

* * * * *